(12) United States Patent
Kim et al.

(10) Patent No.: US 11,840,793 B2
(45) Date of Patent: *Dec. 12, 2023

(54) WASHING MACHINE

(71) Applicant: LG Electronics Inc., Seoul (KR)

(72) Inventors: Sunghoon Kim, Seoul (KR);
Hwanchan Ryu, Seoul (KR); Hyunjae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 113 days.

This patent is subject to a terminal disclaimer.

(21) Appl. No.: 17/505,232

(22) Filed: Oct. 19, 2021

(65) Prior Publication Data
US 2022/0034021 A1 Feb. 3, 2022

Related U.S. Application Data

(63) Continuation of application No. 16/455,078, filed on Jun. 27, 2019, now Pat. No. 11,168,435.

(30) Foreign Application Priority Data

Jun. 27, 2018 (KR) .................. 10-2018-0074390
Jun. 18, 2019 (KR) .................. 10-2019-0072392

(51) Int. Cl.
*D06F 39/08* (2006.01)
*D06F 37/04* (2006.01)
*D06F 37/26* (2006.01)

(52) U.S. Cl.
CPC ............ *D06F 39/083* (2013.01); *D06F 37/04* (2013.01); *D06F 37/266* (2013.01); *D06F 39/085* (2013.01); *D06F 39/088* (2013.01)

(58) Field of Classification Search
CPC .... D06F 39/083; D06F 39/085; D06F 39/088; D06F 37/04; D06F 37/266
(Continued)

(56) References Cited

U.S. PATENT DOCUMENTS 11,168,435 B2 * 11/2021 Kim ................. D06F 39/083
2014/0033449 A1  2/2014 Im et al.
(Continued)

FOREIGN PATENT DOCUMENTS

CN   102121186   7/2011
CN   102418257   4/2012
(Continued)

OTHER PUBLICATIONS

CN Office Action in Chinese Appln. No. 201910565943.1, dated Feb. 1, 2021, 16 pages (with English translation).
(Continued)

*Primary Examiner* — Tinsae B Ayalew

(74) *Attorney, Agent, or Firm* — Fish & Richardson P.C.

(57) ABSTRACT

A washing machine includes a gasket that includes a plurality of nozzles and a plurality of port receiving pipes communicating with the plurality of nozzles, respectively, and a distribution pipe that includes a transport conduit and a plurality of outlet ports protruding from the transport conduit toward the gasket body. The transport conduit includes a first portion spaced apart from an outer circumferential surface of the gasket body. Among the plurality of outlet ports, a first lower outlet port protrudes from the first portion, and the first lower outlet port and the first lower port receiving pipe are coupled to each other in a space where the first portion of the transport conduit and the outer circumferential surface of the gasket body are spaced apart, so that the gasket and the distribution pipe are connected tightly.

20 Claims, 13 Drawing Sheets

(58) Field of Classification Search
USPC .......................................................... 68/3 R
See application file for complete search history.

(56) References Cited

U.S. PATENT DOCUMENTS

2014/0352363 A1  12/2014  Kim
2018/0117645 A1   5/2018  Kwon et al.

FOREIGN PATENT DOCUMENTS

| CN | 103243523 | 8/2013 |
| CN | 103562458 | 2/2014 |
| CN | 107217449 | 9/2017 |
| EP | 2471993 | 7/2012 |
| EP | 2634303 | 9/2013 |
| EP | 2719814 | 4/2014 |
| EP | 3483329 | 5/2019 |
| JP | 2011139815 | 7/2011 |
| JP | 2012070810 | 4/2012 |
| KR | 20110040178 | 4/2011 |
| WO | WO2016136154 | 9/2016 |

OTHER PUBLICATIONS

EP Search Report in European Application No. 19182946, dated Dec. 16, 2019, 7 pages.

PCT International Search Report in International Application No. PCT/KR2019/007664, dated Oct. 29, 2019, 4 pages.

Office Action in Japanese Appln. No. 2020-572551, dated Feb. 15, 2022, 10 pages (with English translation).

* cited by examiner

WASHING MACHINE

CROSS-REFERENCE TO RELATED APPLICATIONS

This application is a continuation of U.S. application Ser. No. 16/455,078, filed on Jun. 27, 2019, which claims the priority benefit of Korean Application No. 10-2019-0072392, filed on Jun. 18, 2019, and Korean Application No. 10-2018-0074390, filed on Jun. 27, 2018. The disclosures of the prior applications are incorporated by reference in their entirety.

BACKGROUND OF THE INVENTION

1. Field of the Invention

The present invention relates to a washing machine and particularly to a washing machine having nozzles that spray water, discharged from a tub and circulated along a circulation pipe, into a drum.

2. Description of the Related Art

In general, a washing machine is an apparatus for removing a contaminant adhered to clothes, bedding, etc. (hereinafter, referred to as 'the laundry') using a chemical disintegration of water and a detergent and a physical operation such as a friction between water and the laundry. The washing machine includes a tub containing water, and a drum rotatably provided in the tub to accommodate laundry.

Korean Patent Application Publication No. 10-2011-0040180 (hereinafter, referred to as a "related art") discloses a washing machine that circulates water, discharged from a tub, using a circulation pump and sprays the circulated water into a drum through a spray nozzle. The washing machine is in a structure in which a distributer is coupled to the circulation pump to distribute wash water and first and second spray paths are connected to the distributer to guide the wash water to first and second spray nozzles, respectively. In addition, the spray nozzles are connected to a gasket by connectors passing through the gasket and are connected to the spray paths.

The related art discloses a washing machine having two spray nozzles, but the washing machine is not capable of uniformly wetting laundry since spray directions are limited. In particular, although various new technologies for controlling rotation of the drum have been developed to provide diversity to movement of laundry loaded in the drum, it is hard to expect remarkable improvement in performance using the conventional structure.

In addition, the conventional technology has a complex structure because the spray nozzles need to be coupled to the gasket by passing the connectors through the gasket, the spray nozzles connected to the circulation pump need to be in number corresponding to the number of spray nozzles, and a plurality of flow paths and the plurality connectors need to be coupled, respectively. In addition, the manufacturing procedure is bothersome due to the assembling process.

In addition, the plurality of spray paths may be interfered with structures, such as a balancer, in the surroundings of the tub. In order to avoid such interference, the structure and position of the balancer or the like are limited.

In addition, there are many portions for connecting the pump, the spray paths, the connectors, and the spray nozzles, and wash water is likely to leak through the portions. In addition, there is also a hygiene issue because of solidification of detergent in the wash water or pigmentation of a contaminant.

SUMMARY OF THE INVENTION

An object of the present invention is to provide a washing machine having a plurality of nozzles for uniformly spraying water discharged from a tub to thereby uniformly wet laundry, and simplifying a connection structure and an assembling process between a pump and the plurality of nozzles.

Another object of the present invention is to provide a washing machine in which a gasket having nozzles and a distribution pipe guiding water pumped by a pump are connected tightly.

Yet another object of the present invention is to provide a washing machine for tightly connecting a distribution pipe, guiding water pumped by a pump to nozzles and avoiding interference with a structure in the surroundings of a tub.

Objects of the present invention should not be limited to the aforementioned objects and other unmentioned objects will be clearly understood by those skilled in the art from the following description.

In order to achieve the aforementioned objects, a washing machine according to an embodiment of the present invention includes a plurality of nozzles for spraying water into a drum, and a distribution pipe supplying water, pumped by a pump, to the plurality of nozzles.

The washing machine includes a laundry entry hole formed in a front surface of a casing, and an opening formed in a front surface of a tub, and a gasket body forming a passage connecting the laundry entry hole and the opening.

The plurality of nozzles is provided on an inner circumferential surface of the gasket body.

The gasket includes a plurality of port receiving pipes communicating with the plurality of nozzles. The plurality of port receiving pips protrudes from an outer circumferential surface of the gasket body.

The distribution pipe includes a transport conduit guiding water, pumped by the pump and a plurality of outlet ports respectively coupled to the plurality of port receiving pipes.

The transport conduit is disposed on the outer circumferential surface of the gasket body.

The plurality of outlet ports protrudes from the transport conduit toward the gasket body.

When the gasket body is bilaterally divided into a first area and a second, the plurality of port receiving pipes includes a first upper port receiving pipe and a first lower port receiving pipe that are vertically disposed in the first area.

The plurality of outlet ports includes a first upper discharge port coupled to the first upper port receiving pipe, and a first lower outlet port coupled to the first lower port receiving pipe.

The transport conduit may include a first portion spaced apart from an outer circumferential surface of the gasket body.

The first lower outlet port may protrude from the first portion.

The distribution pipe may include an inlet port introducing water pumped by the pump. The inlet port may protrude downward from the transport conduit. The inlet port may protrude from the transport conduit at a point lower than the first lower outlet port.

The transport conduit may include a first conduit part disposed on an outer circumferential surface of the first area of the gasket body and upwardly guiding water introduced through the inlet port.

The first conduit part may include a first lower guide section extending in an arc shape along the outer circumferential surface of the first area from a portion where the inlet port is disposed, a first bent section bent at an upper end of the first lower guide section in a direction away from the gasket body, and a lower port section extending upward from the first bent section and spaced apart from the outer circumferential surface of the gasket body.

The first lower outlet port may protrude from the first lower port section.

The first conduit part may include a first upper port section, of which at least a portion is spaced apart from the outer circumferential surface of the gasket body, and The first upper outlet port may protrude from the first upper port section.

The first lower port receiving pipe may be disposed lower than a horizontal line passing through a center of the gasket body. The first upper port receiving pipe may be disposed higher than the horizontal line. A distance between the first lower port receiving pipe and the horizontal line may be smaller than a distance between the first upper port receiving pipe and the horizontal line.

A distance between the first lower port section and a vertical line passing through the center of the gasket body may be greater than a distance between the first upper port section and the vertical line.

The first conduit part may be formed in such a way that at least a portion between the first lower port section and the first upper port section is in an arc shape.

The first conduit part may include a first middle guide section extending upward from the first lower port section to a height corresponding to the center of the gasket body, and a first upper guide section extending in an arc shape from an upper end of the first middle guide section along the outer circumferential surface of the gasket body.

The first upper port section may be bent from an upper end of the first upper guide section in a direction away from the gasket body.

The first upper guide section and the first lower guide section may be in contact with a virtual circle having a center identical to the center of the gasket body, and the first upper port section and the first lower port section may be spaced apart from the virtual circle.

Each of the first upper guide section and the first lower guide section may have at least a portion that is in contact with the outer circumferential surface of the gasket body.

The first upper guide section and the first lower guide section may be spaced apart from the outer circumferential surface of the gasket body. A distance between the first upper port section and the outer circumferential surface of the gasket body may be greater than a distance between the first upper guide section and the outer circumferential surface of the gasket body. A distance between the first lower port section and the outer circumferential surface of the gasket body may be greater than a distance between the first lower guide section and the outer circumferential surface of the gasket body.

The first conduit part may include an inner surface opposing the outer circumferential surface of the gasket body, and the first upper and lower outlet ports may protrude from inner surfaces of the first upper and lower port sections, respectively.

The inner surface of the first upper port section and the inner surface of the first lower port section may be parallel to each other. The first upper outlet port and the first lower outlet port may protrude in parallel with each other.

The distribution pipe may include a first distribution pipe supplying the water, pumped by the pump, to a first nozzle and a second nozzle that respectively communicate with the first upper port receiving pipe and the first lower port receiving pipe.

The first distribution pipe may include a first conduit part guiding water pumped by the pump, a first inlet port introducing water pumped by the pump, and first upper and lower outlet ports.

The first transport conduit may be disposed on the outer circumferential surface of the first area, and the first transport conduit may include the first portion.

The first inlet port may protrude from the first transport conduit. The first inlet port may be disposed lower than the first lower outlet port.

The first upper and lower outlet ports may protrude from the first transport conduit.

The first conduit part may include: a first introducing section inclined in a direction to be further spaced apart from a vertical line, passing through the center of the gasket, toward an upper side and having at least an upper end spaced apart from the outer circumferential surface of the gasket body; and a first lower port section extending upward from an upper end of the first inlet section and spaced apart from the outer circumferential surface of the gasket.

The first inlet port may protrude from the first introduction section.

The first lower outlet port may protrude from the first lower port section.

The first conduit part may include an inner surface opposing the outer circumferential surface of the gasket body, and an outer surface opposite to the inner surface.

The first lower outlet port may protrude from the inner surface of the first lower port section.

The first inlet port may protrude from the outer surface of the first introduction section.

The distribution pipe may include: a first distribution pipe supplying water, pumped by the pump, to a first upper nozzle and a first lower nozzle that communicate with the first upper port receiving pipe and the first lower port receiving pipe, respectively; and a second distribution pipe supplying water, pumped by the pump, to a second upper nozzle and a second lower nozzle that communicating with the second upper port receiving pipe and the second lower port receiving pipe, respectively.

The details of other embodiments are included in the following description and the accompanying drawings.

The washing machine of the present invention may have one or more effects, as below.

First, a plurality of nozzles is provided on an inner circumferential surface of a gasket, and a distribution pipe connects the pump and the plurality of nozzles so as to supply water pumped by the pump to the plurality of nozzles, and thus, there is an advantageous effect of simplifying a connection structure and an assembling process between the pump and the plurality of nozzles.

Second, the gasket includes a plurality of port receiving pipes protruding from an outer circumferential surface of the gasket and having holes communicating with the nozzles, and the distribution pipe includes a transport conduit guiding water pumped by the pump, and an outlet port protruding from the transport conduit toward the gasket, wherein a port area where the outlet port is disposed is spaced apart from the outer circumferential surface of the gasket in a direction outward of the gasket, and wherein the outlet port and a port receiving pipe are coupled in a space between the port area and the outer circumferential surface of the gasket, and thus, there is an advantageous effect of tightly connecting the gasket, which has the nozzles, and the distribution pipe, which guide water pumped by the pump to the nozzles.

Third, the distribution pipe guiding water pumped by the pump to the nozzles is disposed on the outer circumferential surface of the gasket to be tightly connected to the gasket, and thus, there is an advantageous effect of avoiding interference with any other structure in the surroundings of a tub.

Effects of the present invention should not be limited to the aforementioned effects and other unmentioned effects will be clearly understood by those skilled in the art from the claims.

BRIEF DESCRIPTION OF THE DRAWINGS

The embodiments will be described in detail with reference to the following drawings in which like reference numerals refer to like elements wherein.

DETAILED DESCRIPTION OF THE PREFERRED EMBODIMENTS

Figure 1:
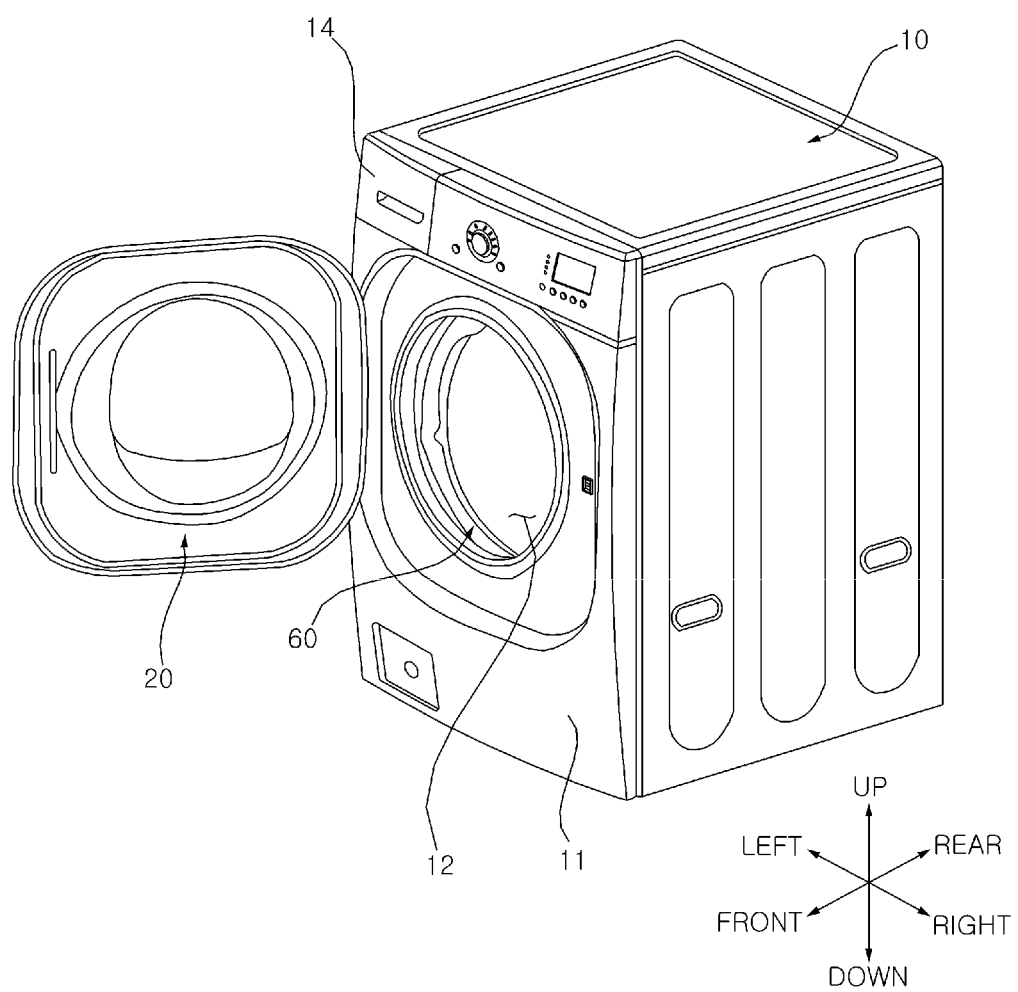
FIG. 1 is a perspective view of a washing machine according to an embodiment of the present invention.

Advantages and features of the present disclosure and methods to achieve them will become apparent from the descriptions of exemplary embodiments herein below with reference to the accompanying drawings. However, the present disclosure is not limited to exemplary embodiments disclosed herein but may be implemented in various different ways. The exemplary embodiments are provided for making the disclosure of the present disclosure thorough and for fully conveying the scope of the present disclosure to those skilled in the art. It is to be noted that the scope of the present disclosure is defined only by the claims. Like reference numerals denote like elements throughout the descriptions.

Hereinafter, the present invention will be described in detail with reference to the accompanying drawings.

Figure 2:
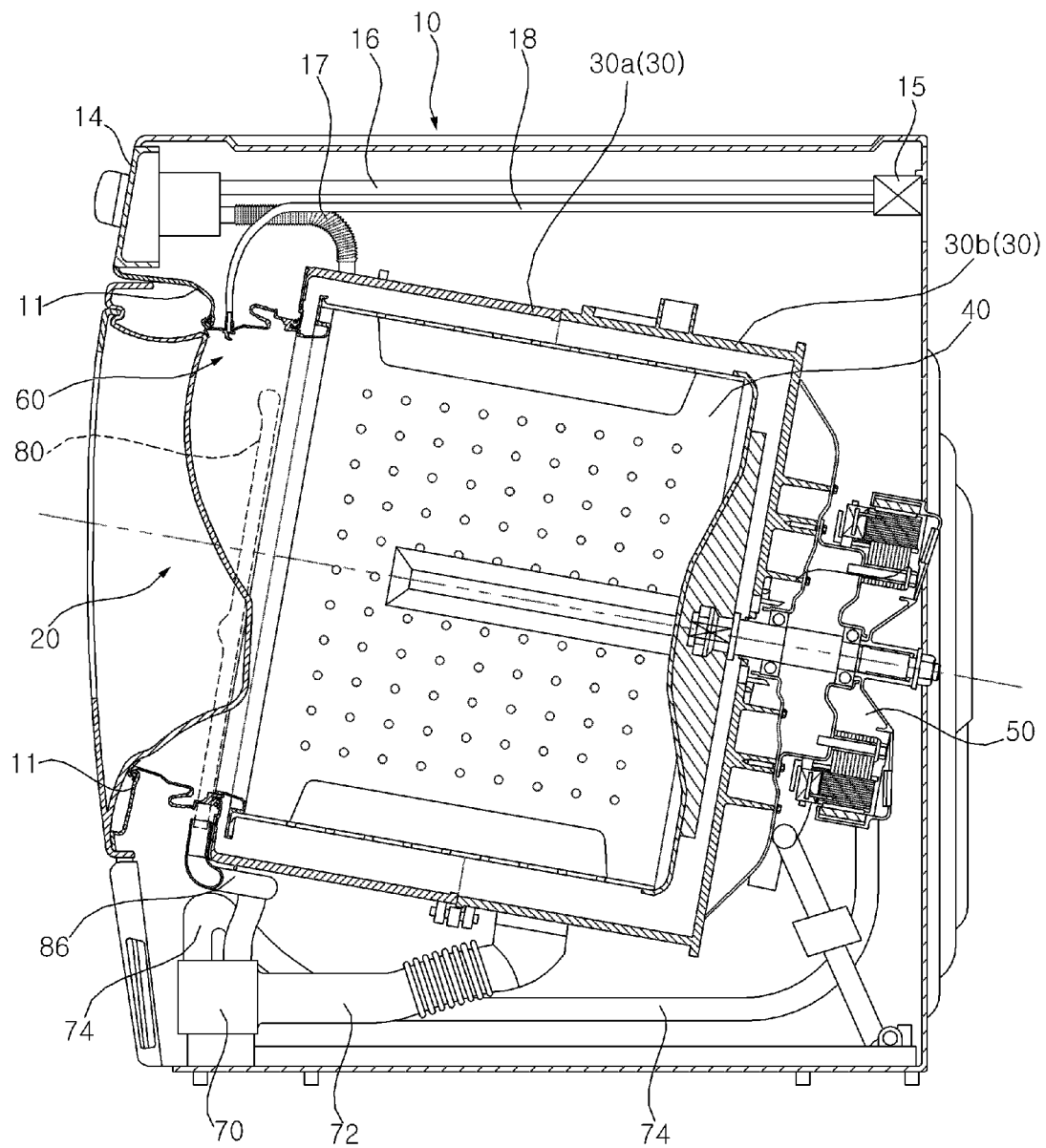
FIG. 2 is a cross-sectional view of the washing machine shown in FIG. 1.

Referring to FIGS. 1 and 2, a washing machine according to the present invention includes a casing 10 forming an exterior appearance of the washing machine, a tub 30 for containing wash water, and a drum 40 rotatably provided in the tub 30 and accommodating laundry. In addition, the washing machine may include a motor (hereinafter, referred to as a "driving unit") for rotating the drum 40.

A front panel 11 having a laundry entry hole 12 formed therein is disposed on a front surface of the casing 10. A door 20 for opening and closing the laundry entry hole 12 is disposed on the front panel 11, and a dispenser 14 for supplying detergent may be installed on the front panel 11.

In addition, a water supply valve 15, a water supply pipe 16, and a water supply hose 17 are installed in the casing 10 so that wash water supplied after passing through the water supply valve 15 and the water supply pipe 16 is mixed with detergent in the dispenser 14 and is then supplied to the tub 30 through the water supply hose 17.

Meanwhile, a direct water supply pipe 18 may be connected to the water supply valve 15 so that wash water is supplied directly to the tub 30 through the direct water supply pipe 18 without being mixed with detergent.

In addition, a pump 70 and a distribution pipe 80 may be installed. The pump 70 and the tub 30 may be connected via a discharge hose 72, and the distribution pipe 80 and the pump 70 may be connected directly to each other or connected via a circulation pipe 86. Accordingly, if the pump 70 operates, wash water contained in the tub 30 may be sprayed into the drum 40 through the distribution pipe 80 and circulate. The pump 70 may be connected to a drain pipe 74 and discharge wash water to the outside through the drain pipe 74.

As described above, the pump 70 of the washing machine according to an embodiment of the present invention functions a drain pump for discharging wash water to the outside and as a circulation pump for circulating wash water. On the contrary, a drain pump and a circulation pump may be installed individually, and, in this case, it is obvious that the drain pump is connected to the drain pipe 74 and the circulation pump is connected to the circulation pipe 86.

Meanwhile, the tub 30 may be formed as a single tub body or may be formed as a combination of a first tub body 30a and a second tub body 30b coupled thereto. In the embodiment of the present invention, an example in which the first tub body 30a and the second tub body 30b are coupled to form the tub 30 is described. Hereinafter, the first tub body 30a is referred to as a "tub" 30.

The tub 30 is disposed in the casing 10, and an opening 32 (see FIG. 4) is formed at the front of the tub 30 to correspond to the laundry entry hole 12 formed in the front panel 11.

The drum 40 for accommodating laundry may be rotatably provided in the tub 30. The drum 40 receives laundry, and is disposed such that an entrance hole through which laundry is loaded is disposed at a front surface. The drum 40 is rotated about an approximately horizontal rotation center line. In this case, "horizontal" does not refer to the mathematical definition thereof. That is, even in the case where the rotation center line is inclined at a predetermined angle relative to a horizontal state, the axis is more like in the horizontal state than in a vertical state, and thus, it is considered that the rotation center line is substantially horizontal. A plurality of through holes may be formed in the drum 40 so as to introduce water contained in the tub 30 into the drum 40.

A plurality of lifter may be provided on an inner surface of the drum 40. The plurality of liters may be disposed at a predetermined angle relative to the center of the drum 40.

When the drum 40 is rotated, laundry repeatedly goes through an operation of being lifted by the lifter and falling.

A driving unit 50 for rotating the drum 40 may be further provided. A driving shaft to be rotated by the driving unit 50 may penetrate the rear of the tub 30 to be coupled to the drum 40.

Preferably, the driving unit 50 includes a direct drive wash motor, and the wash motor may include a stator fixed to the rear of the tub 30, and a rotor rotating by a magnetic force acting in relation with the stator. The driving shaft 38*a* may rotate integrally with the rotor.

Figure 3:
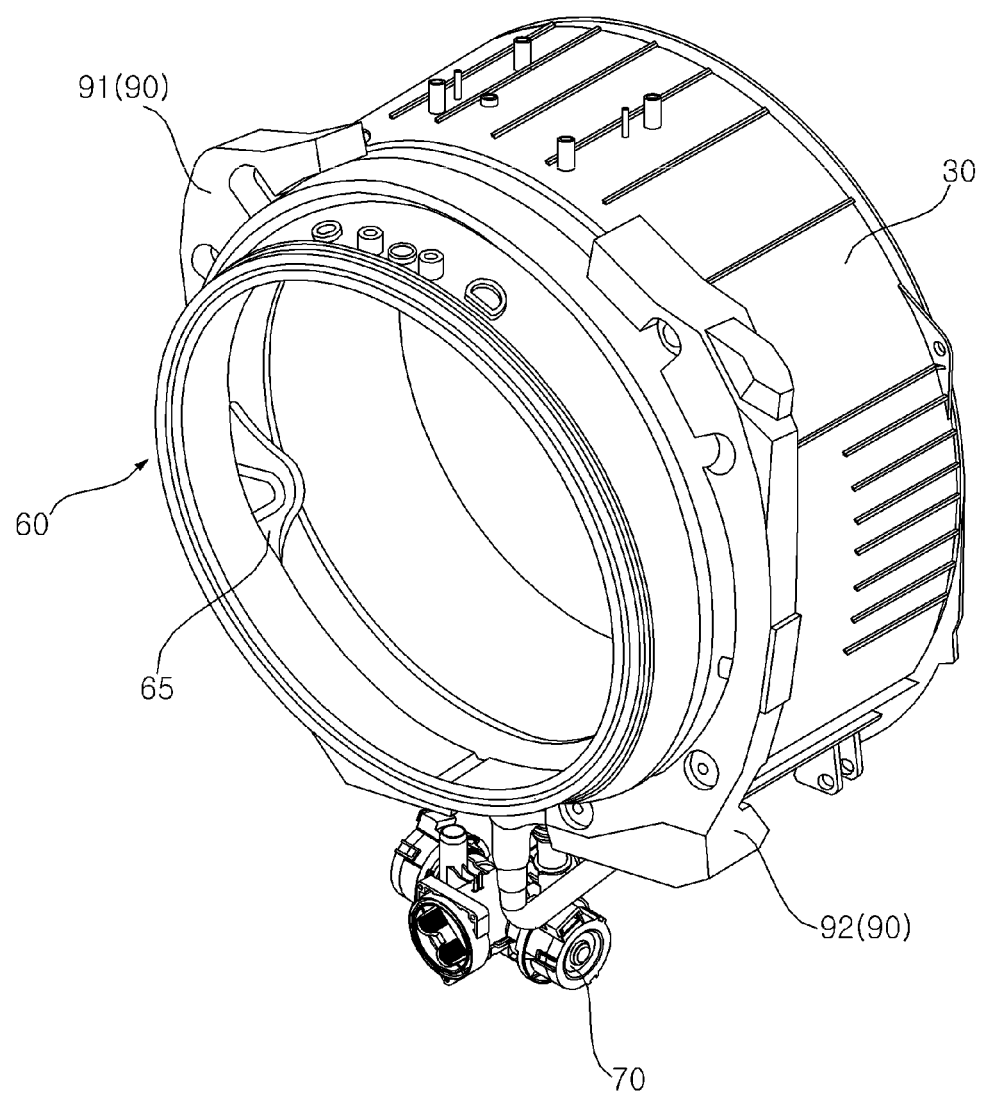
FIG. 3 illustrates a portion of a washing machine according to a first embodiment of the present invention.
Figure 4:
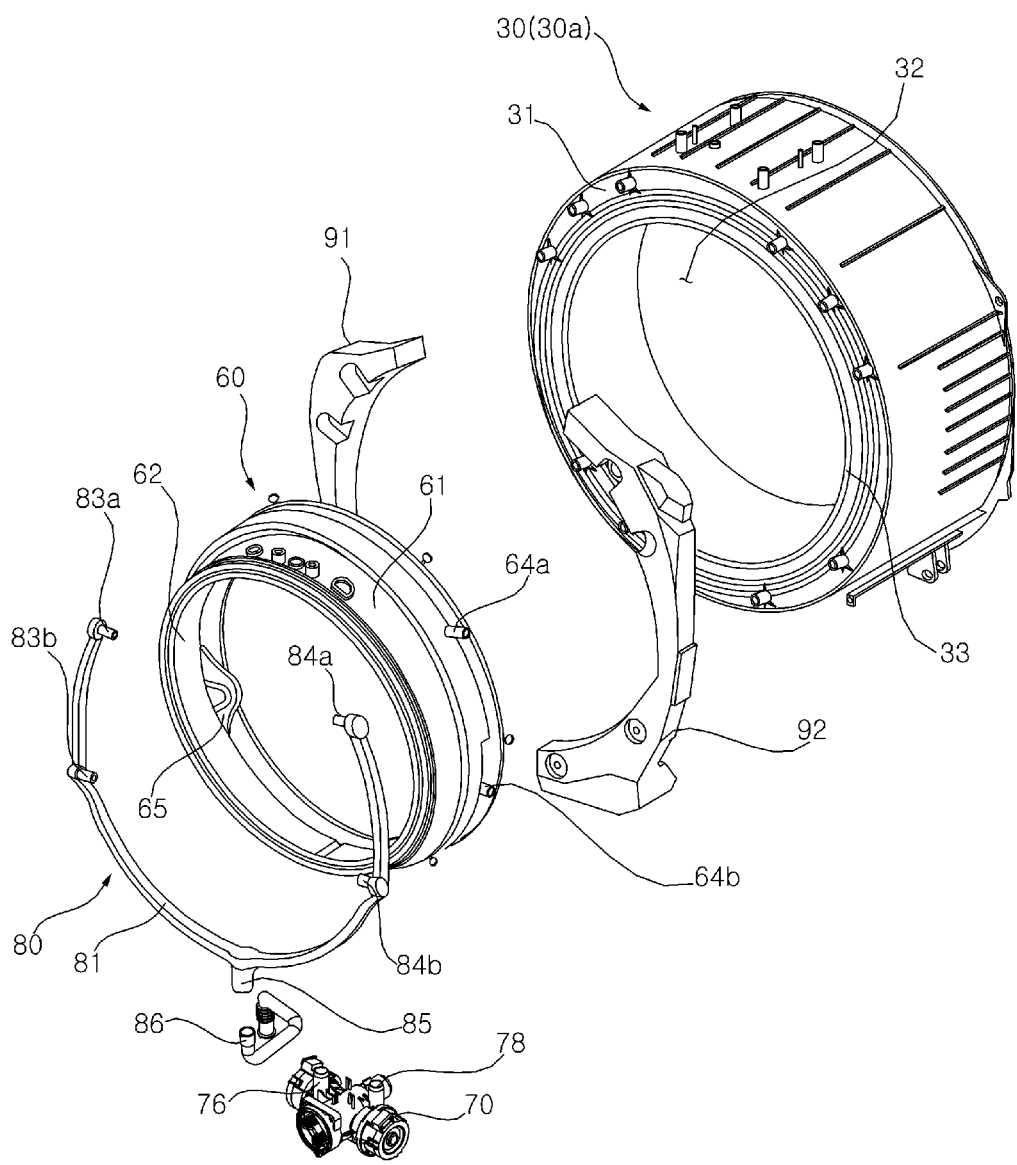
FIG. 4 is an exploded perspective view of an assembly shown in FIG. 3.

Referring to FIGS. 3 and 4, the washing machine according to an embodiment of the present invention includes a gasket 60 for connecting the casing 10 and the tub 30, a plurality nozzle 66 and 67 (see FIG. 6) for spraying water into the drum 40, the pump 70 for pumping water discharged from the tub 30, and a distribution pipe 80 for guiding the water pumped by the pump 70 to the nozzle 66 and 67. In addition, the washing machine may include a balancer 90 disposed at a front surface 31 of the tub 30, and the circulation pipe 86 for guiding the water pumped by the pump 70 to the distribution pipe 80.

Referring to FIGS. 3, 4, 5, and 9, the gasket 60 includes a gasket body 61 and 62 that forms a passage 60P connecting the laundry entry hole 12 of the casing 10 and the opening 32 of the tub 30. An inner circumferential surface facing the central direction of the gasket body 61 and 62 of the gasket 60 may be referred to as an inner circumferential surface 62, and an outer circumferential surface opposite thereto may be referred to the inner circumferential surface 61.

The inner circumferential surface 62 of the gasket body may form the passage 60P connecting the laundry entry hole 12 and the opening 32. The outer circumferential surface 61 of the gasket body may oppose the inner circumferential surface of the balancer 90. The outer circumferential surface of the gasket body of the gasket 60 may oppose the distribution pipe 80.

The gasket 60 is disposed between an edge defining the entry hole 12 of the front panel 11 and an edge defining the opening 32 of the tub 30, and accordingly, a leakage of wash water contained in the tub 30 is prevented.

More specifically, the gasket 60 is formed of a flexible substance such as rubber and has an approximate cylindrical shape (hereinafter, referred to as an annular shape). For example, the gasket 60 may be formed of a substance such as Ethylene Propylene Diene Monomer (EPDM), Thermo Plastic Elastomer (TPE), or the like, but aspects of the present invention are not limited thereto.

As the front boundary of the gasket 60 is connected to the edge of the entry hole 12 of the front panel 11 and the rear boundary of the gasket 60 is connected to the edge of the opening 32 of the tub 30, the body part 61 and 62 connecting the front and rear boundaries of the gasket 60 forms the laundry entry passage 60P. If a space between the tub and the front panel are sealed and the door 20 is closed, the door 20 and the front end of the gasket 60 are tightly brought into contact with each other and the space between the door 20 and the gasket 60 is sealed, and therefore, leakage of wash water is prevented.

A front end part and a rear end part of the gasket 60 are annular, and the gasket 60 has a tubular shape extending from the front end part to the rear end part. The front end part of the gasket 60 is fixed to the casing 10, and the rear end part is fixed to an entrance hole circumference 33 of the tub 30. The gasket 60 may be formed of a flexible or elastic substance. The gasket 60 may be formed of natural rubber or synthetic resin.

The gasket 60 may include a casing coupling part 68*a* coupled to a circumference of the entry hole 12 of the casing 10, a tub coupling part 68*b* coupled to a circumference of the entrance hole circumference 33 of the tub 30, and a gasket body 61 and 62 extending between the casing coupling part 68*a* and the tub coupling part 68*b*.

The casing coupling part 68*a* and the tub coupling part 68*b* have an annular shape. The gasket body may include an annular front end part connected to the casing coupling part 68*a* and an annular rear end part connected to the tub coupling part 68*b*, and have a tubular shape extending from the front end part to the rear end part.

The circumference of the entry hole 12 of the front panel 11 is rolled outwardly, and the casing coupling part 68 may be fitted into a concave area formed by the outward rolled portion.

An annular groove to be wound by a wire may be formed in the casing coupling part 61. After the wire winds around the groove 61*r*, both ends of the wire are bound, and therefore, the casing coupling part 61 is tightly fixed to the circumference of the entrance hole 12*h*.

The entrance hole circumference 33 of the tub 30, which defines the opening 32 of the tub 30, protrudes from the front surface 31 and is rolled outward, and the tub coupling part 68*b* is fitted in a concave area formed by the outward rolled portion. An annular groove to be wound by a clamp, which is formed of a wire, may be formed in the tub coupling part 68*b*. The tub coupling part 68*b* of the gasket is coupled to the entrance opening circumference 33 of the tub, the clamp winds around the groove, and both ends of the clamp are bounded, and accordingly, the tub coupling part 68*b* may be tightly fixed to the entrance hole circumference 33 of the tub 30.

While the casing coupling part 68*a* is fixed to the front panel 11, the tub coupling part 68*b* is displaceable in accordance with movement of the tub 30. Accordingly, the gasket body needs to be able to transform in accordance with the displacement of the tub coupling part 68*b*. In order to allow the gasket body to transform easily, the gasket 60 may include a folding part 61*b* between the casing coupling part 68*a* and the tub coupling part 68*b* (or the body part), and the folding part 61*b* is folded as the tub 30 moves in a direction of eccentricity (or a radial direction).

The gasket body 61 and 62 may include: an annular first flat part 61*a* extending from the casing 10 (or the casing coupling part 68*a*) toward the tub 30 (or the tub coupling part 68*b*) (or toward the rear); the folding part 61*b* bent outward from the first flat part 61*a*, extending toward the casing 10, and bent outward again; and a second flat part 61*c* extending from the folding part 61*b* in a direction toward the tub 30 and having an outer diameter greater than that of the first flat part 61*a*.

Figure 6:
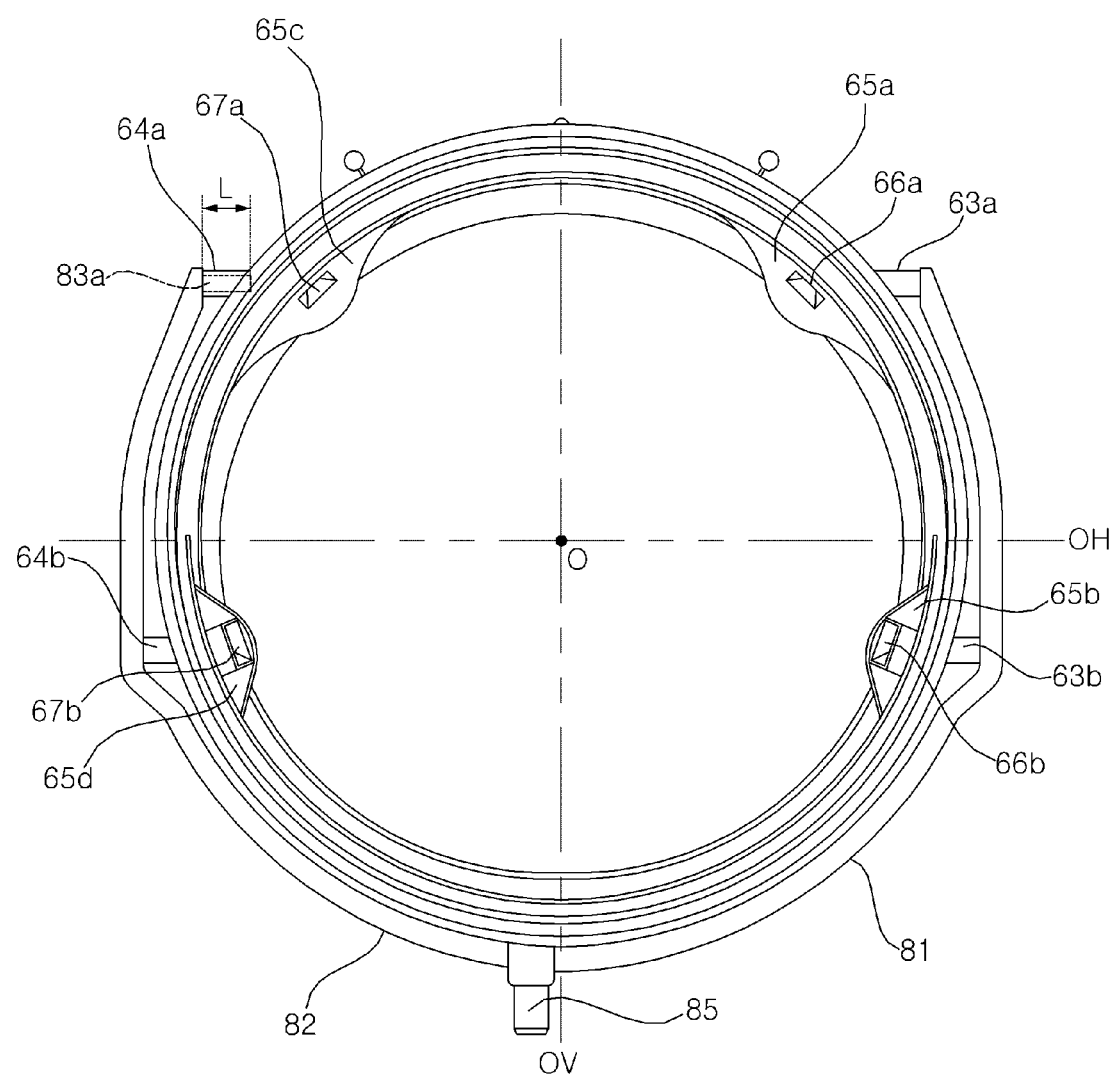
FIG. 6 is a rear view of an assembly including the gasket and a distribution pipe shown in FIG. 4.
Figure 7:
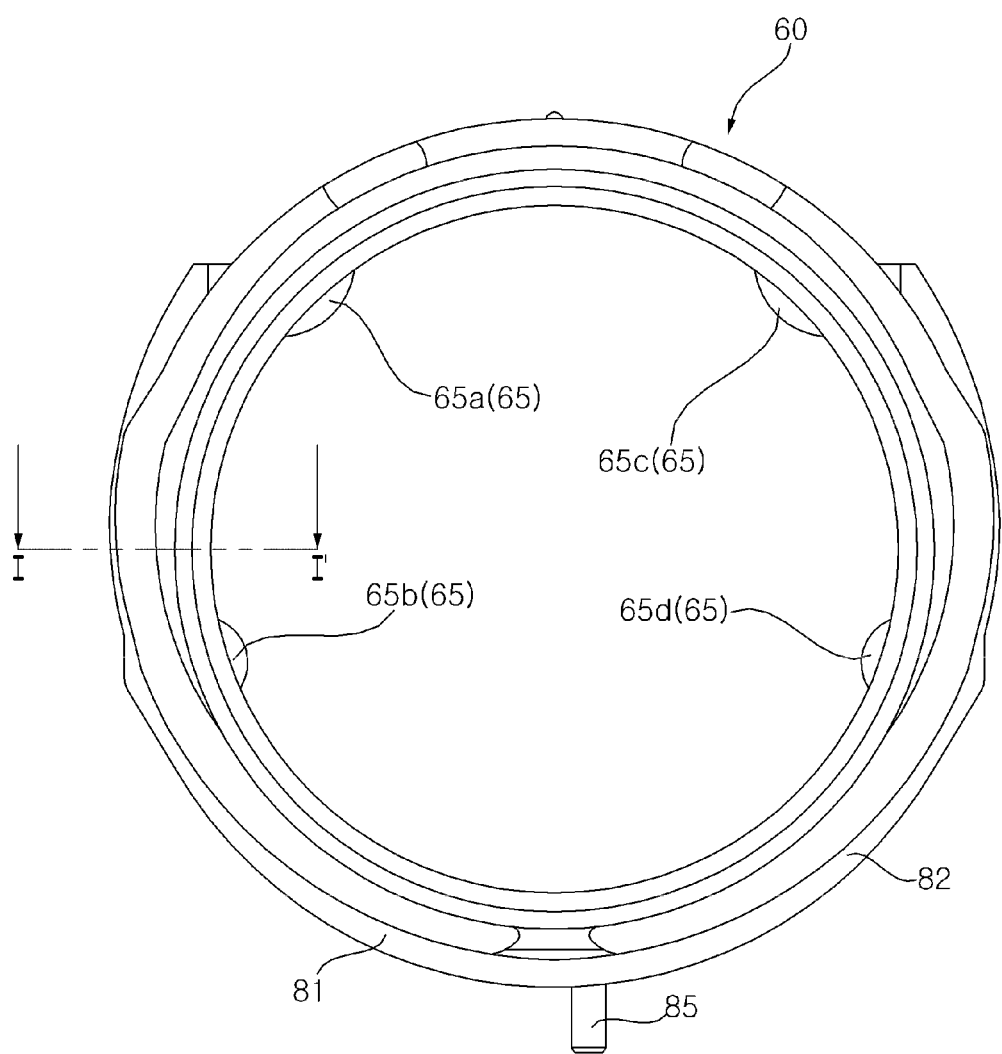
FIG. 7 is a front view of the assembly shown in FIG. 6.

Referring to FIGS. 6 and 7, the plurality of nozzle 66 and 67 may be provided in plural on the inner circumferential surface 62 of the gasket 60. The plurality of nozzles 66 and 67 may include a plurality of upper nozzles 66*a* and 67*a*, and a plurality of lower nozzles 66*b* and 67*b* disposed lower than the upper nozzles 66*a* and 67*a*. The plurality of upper nozzles 66*a* and 67*a* may be disposed higher than the center O of the gasket 60, and the plurality of lower nozzles 66*b* and 67*b* may be disposed lower than the center O of the gasket 60.

In the case where the gasket body 61 and 62 is bilaterally divided into a first area and a second area, a plurality of nozzles 66 and 67 may include a first nozzle 66 disposed in the first area and a second nozzle 67 disposed in the second area. The first nozzle 66 may be disposed on the left side of the inner circumferential surface 62 of the gasket, and the second nozzle 67 may be disposed on the right side of the inner circumferential surface 62 of the gasket.

Each of the first nozzle 66 and the second nozzle 67 may be provided in plural. In the embodiment of the present invention, two first nozzles 66 and two second nozzles 67 are provided, but aspects of the present invention are not limited thereto.

The first nozzle 66 may include a first upper nozzle 66*a* and a first lower nozzle 66*b* that are vertically disposed in the first area. The first lower nozzle 66*b* may be disposed lower than the center O of the gasket 60, and the first upper nozzle 66*a* may be disposed higher than the first lower nozzle 66*b*. The first upper nozzle 66*a* may be disposed higher than the center O of the gasket 60.

The second nozzle 67 may include a second upper nozzle 67*a* ad a second lower nozzle 67*b* that are vertically disposed in the second area. The second lower nozzle 67*b* may be disposed lower than the center O of the gasket 60, and the second upper nozzle 67*a* may be disposed higher than the second lower nozzle 67*b*. The second upper nozzle 67*a* may be disposed higher than the center O of the gasket 60.

The first and second lower nozzles 66*b* and 67*b* may spray circulating water into the drum 40 in an upward direction. The first and second upper nozzles 66*a* and 67*a* may spray circulating water into the drum 40 in a downward direction. The circulating water refers to water that is discharged from the tub 30, pumped by the pump 70, guided to the distribution pipe 80, and sprayed into the drum 40 through the nozzle 66 and 67.

In the gasket 60, there may be provided a direct nozzle for spraying water into the drum 40, and a direct water supply pipe 18 for guiding water supplied through a water supply unit to the direct nozzle. The direct nozzle may be a whirl nozzle or a spray nozzle, but aspects of the present invention are not necessarily limited thereto. When viewed from the front, the direct nozzle may be disposed on a vertical line OV. A window 22 may protrude toward the drum 40 further than the direct nozzle. A water stream sprayed through the direct nozzle may touch the window 22, and, in this case, the effect of cleaning the window 22 may be achieved.

Figure 5:
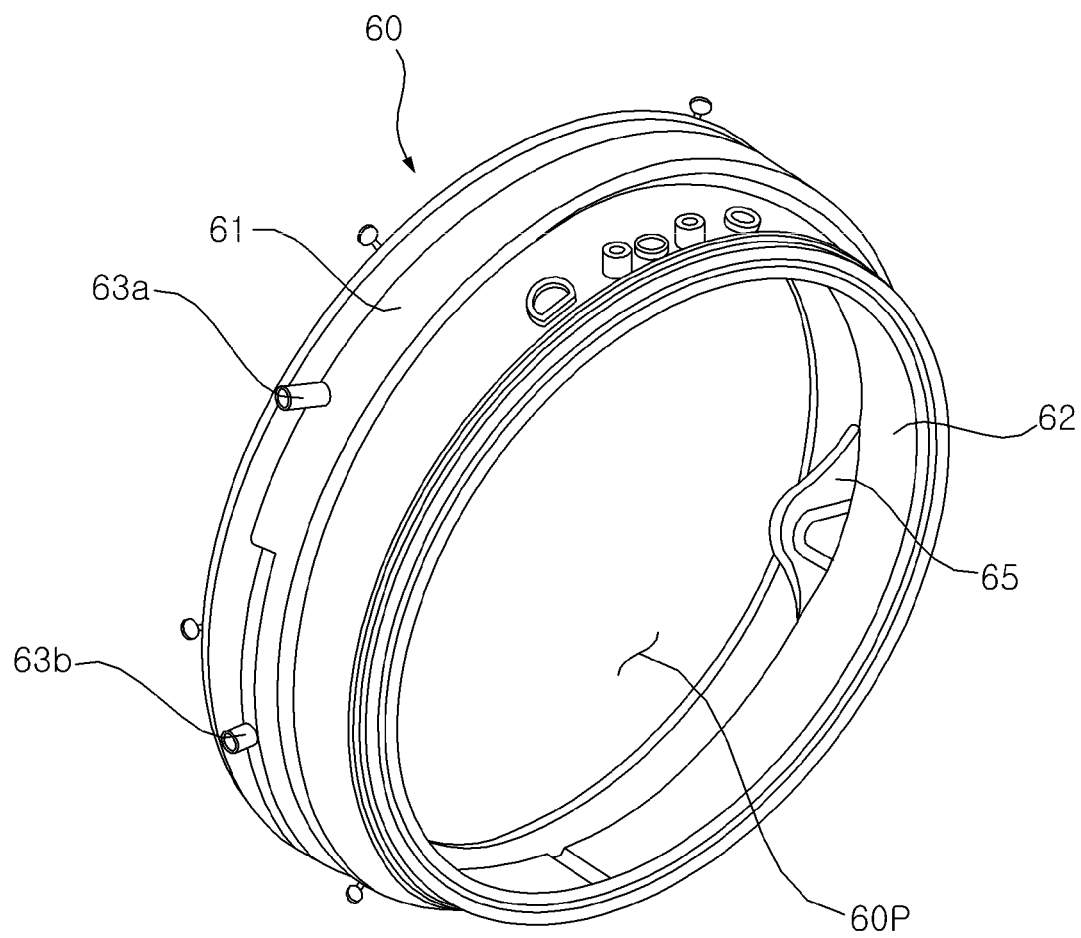
FIG. 5 is a perspective view of a gasket shown in FIG. 4.

Referring to FIGS. 5 and 6, the gasket 60 includes a plurality of port receiving pipes 63 and 64 communicating with the nozzle 66 and 67. The plurality of port receiving pipes 63 and 64 may be formed to protrude from the outer circumferential surface 61 of the gasket body. A plurality of outlet ports 83 and 84 described in the following are inserted into the plurality of port receiving pipes 63 and 64, and the plurality of port receiving pipes 63 and 64 is formed to protrude from the outer circumferential surface 61 of the gasket 60, and accordingly, water supplied from the distribution pipe 80 to the plurality of nozzles 66 and 67 is prevented from leaking through between the plurality of port receiving pipes 62 and 63 and the plurality of outlet ports 83 and 84.

The plurality of port receiving pipes 63 and 64 may be in number corresponding to the number of the nozzles 66 and 67. In the case where the gasket body 61 and 62 is bilaterally divided into the first area and the second area, the plurality of port receiving pipes 63 and 64 may include a first port receiving pipe 63 disposed in the first area and a second port receiving pipe 64 disposed in the second area.

The first port receiving pipe 63 may communicate with the first nozzle 66, and the second port receiving pipe 64 may communicate with the second nozzle 67. The first port receiving pipe 63 may be disposed on the left side of the outer circumferential surface 61 of the gasket body, and the second port receiving pipe 64 may be disposed on the right side of the outer circumferential surface of the gasket body.

The first port receiving pipe 63 may include a first upper port receiving pipe 63*a* and a first lower port receiving pipe 63*b* that are vertically disposed in the first area. The first lower port receiving pipe 63*b* is disposed lower than the center O of the gasket 60, and the first upper port receiving pipe 63*a* may be disposed higher than the first lower port receiving pipe 63*b*. The first upper port receiving pipe 63*a* may be disposed higher than the center O of the gasket 60.

The first lower port receiving pipe 63*b* communicates with the first lower nozzle 66*b*, and the first upper port receiving pipe 63*a* communicate with the first upper nozzle 66*a*. The first upper port receiving pipe 63*a* and the first lower port receiving pipe 63*b* may protrude in directions parallel to each other.

The second port receiving pipe 64 may include a second upper port receiving pipe 64*a* and a second lower port receiving pipe 64*b* that are vertically disposed in the second area. The second lower port receiving pipe 64*b* is disposed lower than the center O of the gasket 60, and the second upper port receiving pipe 64*a* may be disposed higher than the second lower port receiving pipe 64*b*. The second upper port receiving pipe 64*a* may be disposed higher than the center O of the gasket 60.

The second lower port receiving pipe 64*b* communicates with the second lower nozzle 67*b*, and the second upper port receiving pipe 64*a* communicates with the second upper nozzle 67*a*. The second upper port receiving pipe 64*a* and the second lower port receiving pipe 64*b* may protrude in directions parallel to each other.

The upper nozzles 66*a* and 67*a* of the first and second nozzles 66 and 67, and the upper port receiving pipes 63*a* and 64*a* of the first and second port receiving pipes 63 and 64 may be disposed higher than a horizontal line OH passing through the center O of the gasket 60. The lower nozzles 66*b* and 67*b* of the first and second nozzles 66 and 67, and the lower port receiving pipes 63*b* and 64*b* of the first and second port receiving pipes 63 and 64 may be disposed lower than the horizontal line OH passing through the center O of the gasket 60. In order to smoothly spray water toward laundry contained in the drum 40 and to uniformly spray water to any laundry item at any location in the drum 40, a distance between each of the lower nozzles 66*b* and 67*b* and the horizontal line OH passing through the center O of the gasket 60 may be smaller than a distance between each of the upper nozzles 66*a* and 67*a* and the horizontal line OH passing through the center O of the gasket 60. Accordingly, a distance between each of the lower port receiving pipes 63*b* and 64*b* and the horizontal line OH passing through the center O of the gasket 60 may be smaller than a distance between each of the upper port receiving pipes 63*a* and 64*a* and the horizontal line OH passing through the center O of the gasket 60.

Laundry received in the drum 40 is piled up at a lower side in the drum 40 due to the weight of gravity. In order to smoothly spray water into the laundry received in the drum 40, the lower nozzles 66*b* and 67*b* need to be disposed at a height spaced a considerable distance from the lowest point in the gasket 60. For example, an angle formed by each of the lower nozzles 66*b* and 67*b*, the center O of the gasket 60, and the lowest point in the gasket 60 may be 45° or greater. In addition, an angle formed by the lower port receiving pipes 63*b* and 64*b*, the center O of the gasket 60, and the lowest point in the gasket 60 may be 45° or greater.

In order to uniformly spray water to laundry received in the drum 40, the upper nozzles 66*a* and 67*a* need to be spaced a considerable distance from the lower nozzles 66b and 67b. For example, an angle formed by the upper nozzle 66a and 67a, the center O of the gasket 60, and the horizontal line OH passing through the center O of the gasket 60 may be 30° or greater. In addition, an angle formed by each of the upper port receiving pipes 63a and 64a, the center O of the gasket 60, and the horizontal line OH passing through the center O of the gasket 60 may be 30° or greater.

Referring to FIGS. 6 and 7, a plurality of protruding part 65 may be formed in the inner circumferential surface 62 of the gasket at portion respectively corresponding to the plurality of port receiving pipes 63 and 64 to protrude inward, and the plurality of nozzles 66 may be formed at the protruding parts 65.

The plurality of protruding parts 65 may include a first protruding part 65a, a second protruding part 65b, a third protruding part 65c, and a fourth protruding part 65d protruding inwardly at portions that respectively correspond to the first upper and lower port receiving pipes 63a and 63b and the second upper and lower port receiving pipes 64a and 64b. The first upper and lower nozzles 66a and 66b and the second upper and lower nozzles 67a and 67b may be respectively formed at the first protruding part 65a, the second protruding part 65b, the third protruding part 65c, and the fourth protruding part 65d.

Figure 8:
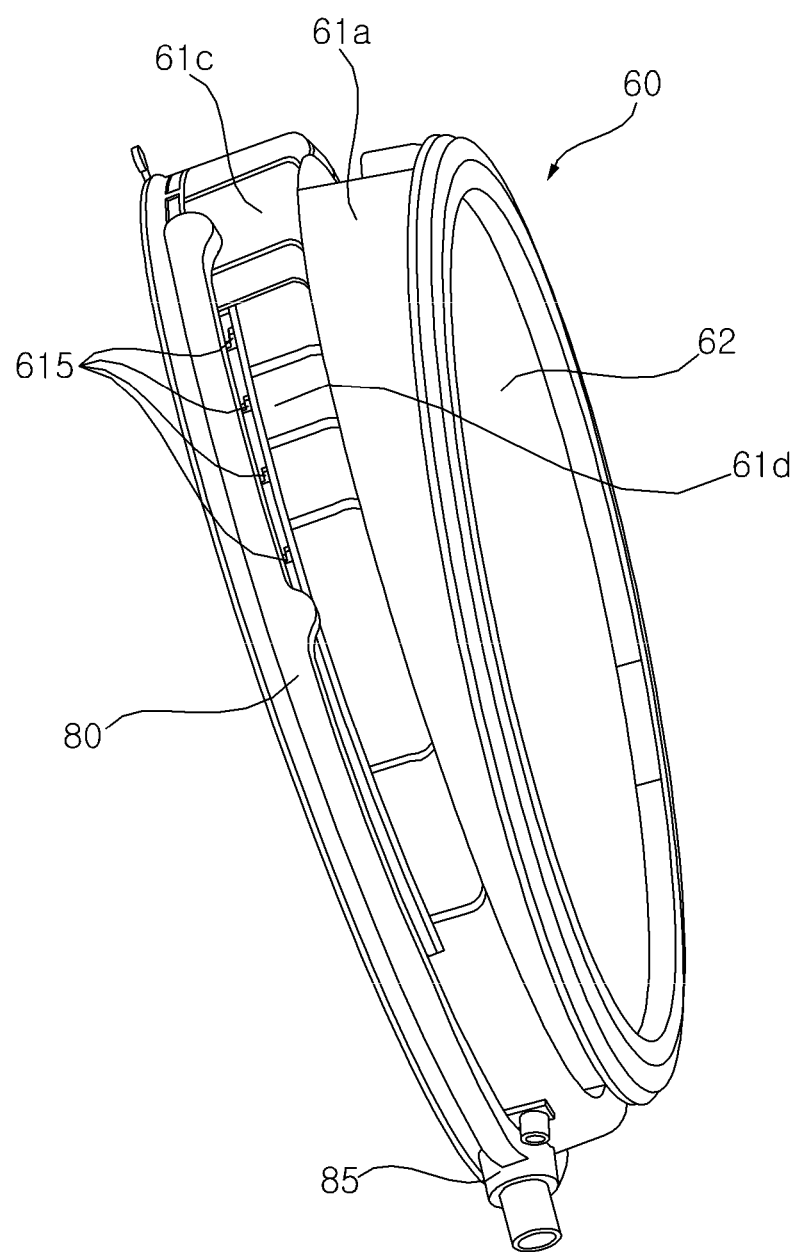
FIG. 8 is a perspective view of the assembly shown in FIG. 6.
Figure 9:
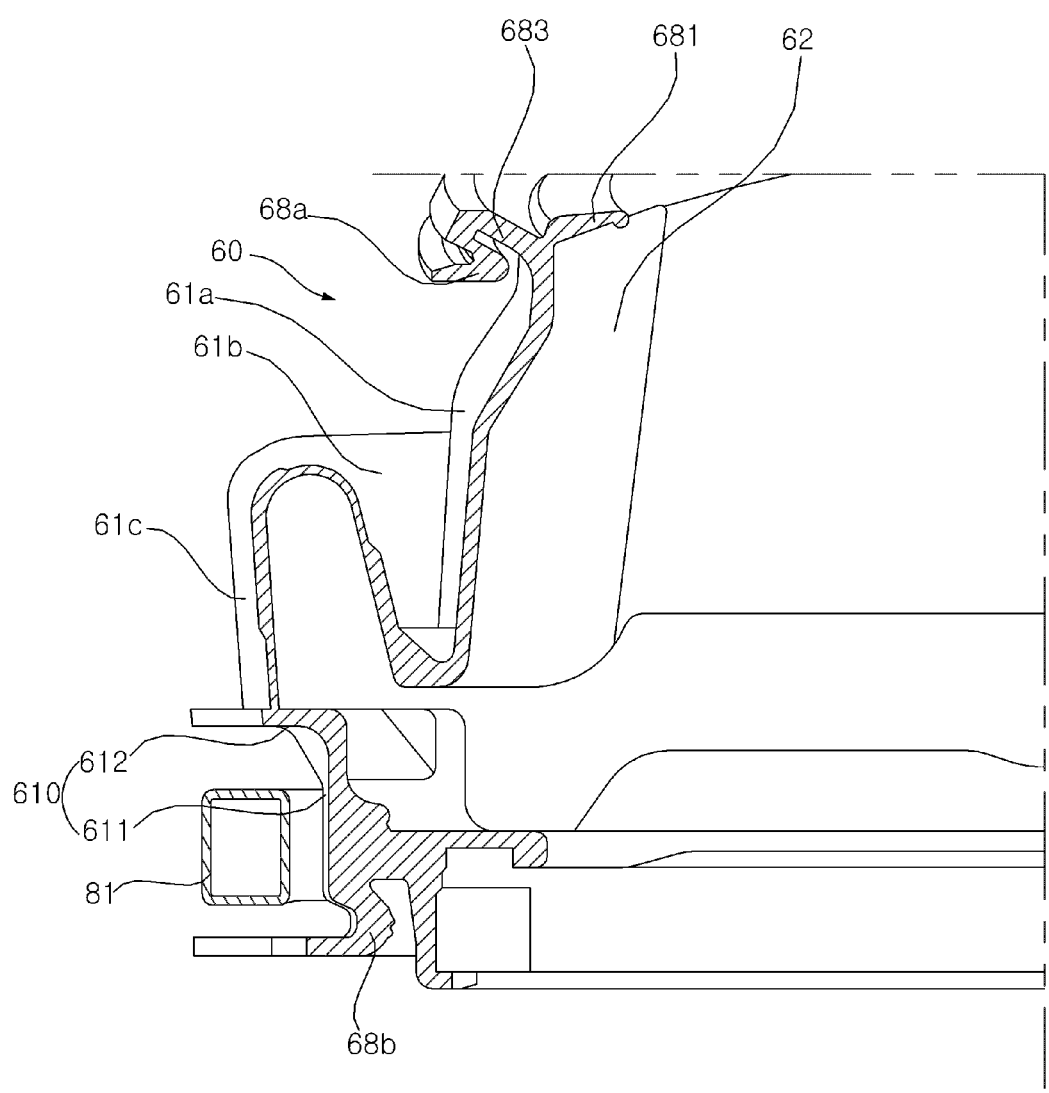
FIG. 9 is a cross-sectional view taken along line I-I in FIG. 7.
Figure 12:
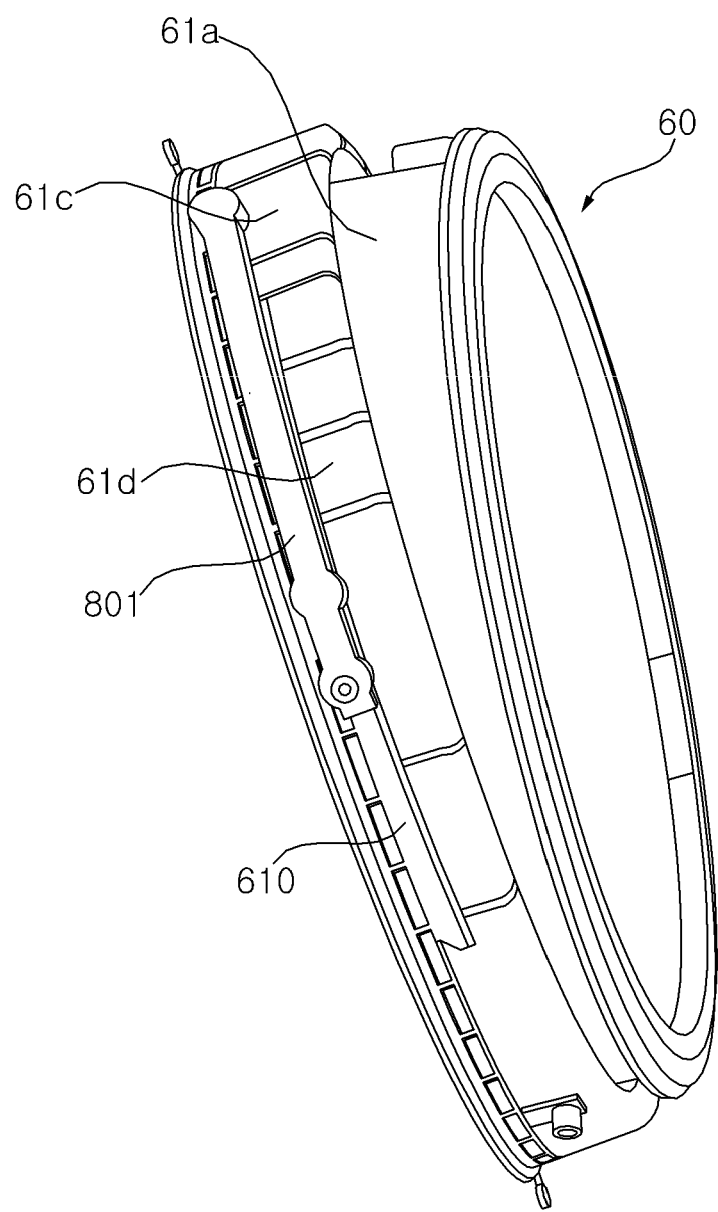
FIG. 12 is a perspective view of an assembly including a gasket and a distribution pipe shown in FIG. 11.

Referring to FIGS. 8, 9, and 12, the gasket 60 includes a recessed portion 610 that is recessed inward further than a portion adjacent to the outer circumferential surface 61 of the gasket body. At least a portion of the distribution pipe 80 is disposed in the recessed portion 610. At least a portion of a transport pipe 81 and 82 may be disposed in the recessed portion 610.

The recessed portion 610 is formed to be recessed inward further than a portion adjacent to the front of the recessed portion 610. The recessed portion 610 may be formed as a portion of the outer circumferential surface 61 of the gasket body is recessed inwardly. A riser portion 61d protruding outward further than the surrounding area may be formed on the outer circumferential surface 61 of the gasket body, and the recessed portion 610 may be formed on one side (a rear side) of the riser portion 61d.

A rib 615 may be formed in the outer circumferential surface 61 of the gasket body. The rib 615 may protrude from the outer circumferential surface 61 of the gasket body in a radial direction of the gasket 60. That is, the rib 615 may extend in a direction that is orthogonal to a tangent line of the outer circumferential surface 61 of the gasket body of the gasket 60.

The distribution pipe 80 may be disposed to allow at least a portion thereof to be brought into contact with the rib 615. At least a portion of the transport conduit 81 and 82 in the distribution pipe 80 may be brought into contact with the rib 615. Since at least a portion of the distribution pipe 80 is disposed in the recessed portion 610, the rib 615 may be formed in the recessed portion 610.

Referring to FIGS. 6 to 10, the distribution pipe 80 includes the transport conduit 81 and 82 for guiding water pumped by the pump 70, and the outlet ports 83 and 84 protruding from the transport conduit 81 and 82 toward the gasket 60 and coupled to the port receiving pipe 63 and 64. In addition, the distribution pipe 80 may include an inlet port 85 introducing water discharged from the pump 70, and the transport conduit 82 may guide the water introduced through the inlet port 85 to the outlet ports 83 and 84.

The transport conduit 81 and 82 of the distribution pipe 80 is disposed on the outer circumferential surface 61 of the gasket body. The distribution pipe 80 may be inserted into the gasket 60 as the plurality of outlet ports 83 and 84 are inserted into the plurality of port receiving pipes 63 and 64. The transport conduit 81 and 82 of the distribution pipe 80 may be disposed between the outer circumferential surface 61 of the gasket body and the balancer 90. Accordingly, the distribution pipe 80 may be installed without a need for an additional space.

The distribution pipe 80 may be formed of synthetic resin that is harder or stiffer than the gasket 60. The distribution pipe 80 maintains a predetermined shape in spite of vibration occurring during operation of the washing machine, and the distribution pipe 80 is relatively rigid compared to the gasket 60 that transforms in response to vibration of the tub 30.

In addition, the circulation pipe 86 may be flexible to transform in response to vibration of the tub 30. In this case, the distribution pipe 80 may be formed of synthetic resin harder or stiffer than the circulation pipe 86.

A distribution pipe 80 of a washing machine according to a first embodiment of the present invention may have an upper side 88 that is in an open ring shape. That is, the distribution pipe 80 may include an inlet port 85 introducing water pumped by the pump 70, one or more outlet ports 83 and 84 discharging the introduced water to be spayed into the drum 40 and a transport conduit 81 and 82 connecting the inlet port 85 and the outlet ports 83 and 84. One end of a left conduit 81 of the transport conduit 81 and 82 and one end of a right conduit 82 of the transport conduit 81 and 82 may be connected to each other at a point where the inlet port 85 is disposed, whereas the other end of the left conduit 81 and the other end of the right conduit 82 may be separated from each other.

The inlet port 85 may be formed at a lower side of the transport conduit 81 and 82 to protrude downward, and the outlet port 83 and 84 may be formed at each of the left and right parts of the distribution pipe 80 to protrude inwardly (or toward the gasket). The circulation pipe 86 may be disposed between the inlet port 85 and a circulation port 87 formed in the pump 70, so that wash water in the tub is introduced into the inlet port 85 through the circulation pipe 86.

A plurality of outlet ports 83 and 84 may include plurality of upper outlet ports 83a and 84a coupled to the upper port receiving pipe 63a and 64a of the gasket 60, and a plurality of lower outlet ports 83b and 84b coupled to the lower port receiving pipe 63b and 64b of the gasket 60. The plurality of upper outlet ports 83a and 84a and the plurality of lower outlet ports 83b and 84b may protrude from the transport conduit 81 and 82 toward the gasket body 61 and 62 in directions parallel to each other (which is in other words parallel directions). The plurality of upper outlet ports 83a and 84a and the plurality of lower outlet ports 83b and 84b may protrude in parallel with a horizontal line OH passing through the center O of the gasket.

The inlet port 85 is connected to the transport conduit 81 and 82 at a point lower than any of the plurality of outlet ports 83 and 84. The inlet port 85 is connected to the transport conduit 81 and 82 at a point lower than the plurality of lower outlet ports 83b and 84b.

The transport conduit 81 and 82 includes a first conduit part 81 forming the left side of the transport conduit 81 and 82 with reference to the inlet port 85, and a second conduit part 82 forming the right side of the transport conduit 81 and 82 with reference to the inlet port 85. The first conduit part 81 and the second conduit part 82 are connected at a lower side, and the inlet port 85 may protrude downward at the point where the first and second conduit parts are connected to each other.

The transport conduit 81 and 82 branches circulating water introduced through the inlet port 84 to thereby form a first sub-flow (water flowing along the first conduit part 81) and a second sub-flow (water flowing along the second conduit part 82). The first sub-flow may be sprayed into the drum 40 through the first nozzle 66, and the second sub-flow may be sprayed into the drum 40 through the second nozzle 67.

The transport conduit 81 and 82 may be disposed between the gasket 60 and the balancer 90. The transport conduit 81 and 82 may be disposed in a manner in which an inner surface of the transport conduit 81 and 82 thereof opposes the outer circumferential surface 61 of the gasket body and an outer surface of the transport conduit 81 and 82 opposes the balancer 90.

Figure 10:
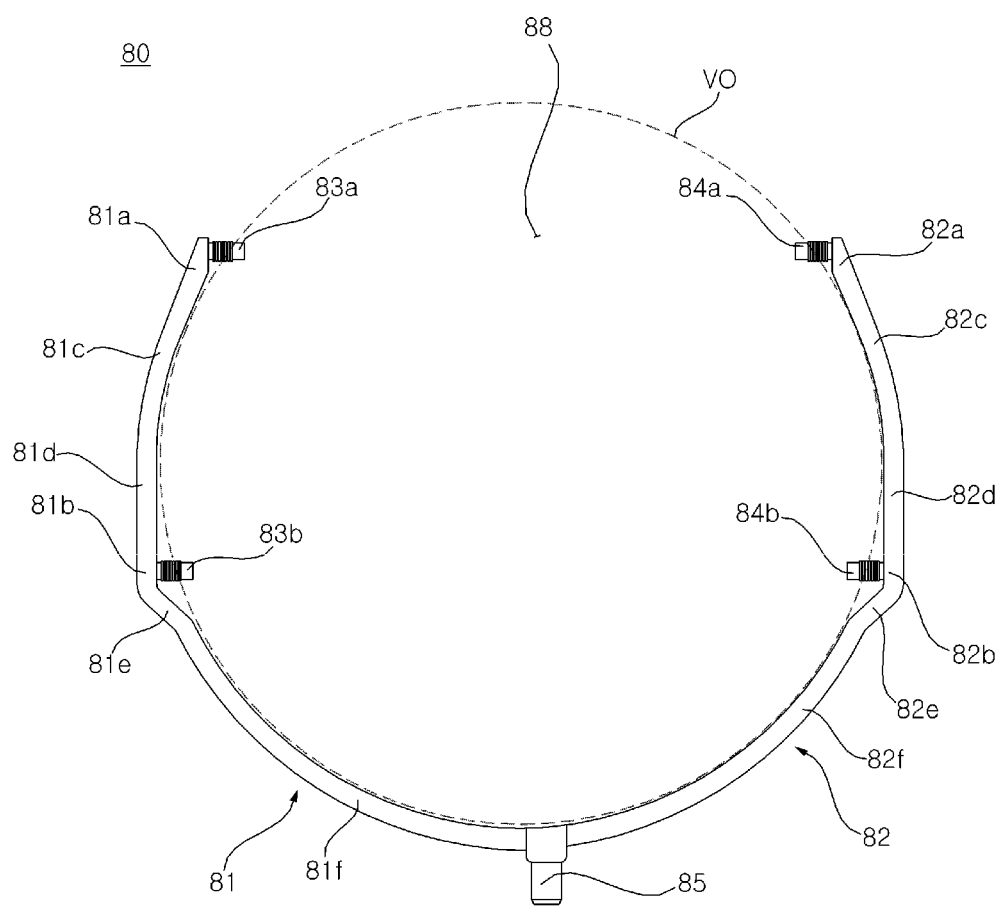
FIG. 10 is a front view of the distribution pipe shown in FIG. 4.

Referring to FIG. 10, the transport conduit 81 and 82 according to the washing machine according to the first embodiment of the present invention may be formed in an arc shape having a central angle of 180° or greater and an open upper side, and may be bilaterally symmetrical. The transport conduit 81 and 82 may include the first conduit part 81 disposed in the left side, and the second conduit disposed in the right side. The first conduit part 81 and the second conduit part 82 may be bilaterally symmetrical about the vertical line OV passing through the center O of the gasket 60.

The transport conduit 81 and 82 is disposed on the outer circumferential surface 61 of the gasket body, and the distribution pipe 80 may be coupled to the gasket 60 as the outlet ports 83 and 84 are inserted into the port receiving pipes 63 and 64. The plurality of outlet ports 83 and 84 protrude from the transport conduit 81 and 82 toward the gasket body 61 and 62, and the plurality of port receiving pipes 63 and 64 protrude from the outer circumferential surface 61 of the gasket body. Accordingly, a coupling space is needed between the distribution pipe 80 and the gasket 60.

In particular, the transport conduit 81 and 82 of the washing machine according to the first embodiment has a unique shape so that portion where the plurality of lower outlet ports 83b and 84b is disposed are spaced apart from the outer circumferential surface 61 of the gasket body.

As described above, the distance between each of the lower port receiving pipes 63b and 64b and the horizontal line OH passing through the center of O the gasket is smaller than the distance between each of the upper port receiving pipes 63a and 64a and the horizontal line OH passing through the center O of the gasket. Accordingly, portions 81a and 82a, where the upper outlet ports 83a and 84a of the transport conduit 81 and 82 are respectively disposed, are bent upward from portions 81c thereunder, and therefore, a sufficient space for coupling the outlet ports 83a and 84a and the port receiving pipes 63a and 64a may be secured. On the contrary, portions 81b and 82b, where the lower outlet ports 83b and 84b of the transport conduit 81 and 82 are respectively disposed, are bent from portions 81f and 82f thereunder toward any one side, and, in this case, a sufficient coupling space cannot be secured.

The transport conduit 81 and 82 may include the portions 81b and 82b spaced apart from the outer circumferential surface 61 of the gasket body, and the lower outlet ports 83b and 84b may be disposed in the spaced portions. A spaced portion in the first conduit part 81 is referred to as a first portion 81b, and a spaced portion in the second conduit part 82 may be referred to as a second portion 82b. The first lower outlet port 83b protrudes from the first portion 81b, and the second lower outlet port 83b protrudes from the second portion 82b.

In order to ensure a space for coupling the lower outlet ports 83b and 84b and the lower port receiving pipes 63b and 64b, the transport conduit 81 and 82 may have bent sections 81e and 82e bent from upper ends of the lower portions 81f and 82f in directions away from the gasket body 61 and 62. The outlet ports 83b and 84b may be disposed at the portions 81b and 82b that are respectively bent upward from the bent sections 81e and 82e.

Hereinafter, the overall shape of the transport conduit 81 and 82 will be described.

The transport conduit 81 and 82 may be divided into a plurality of port sections 81a, 81b, 82a, and 82b, where the outlet ports 83 and 84 (or exemplified as the outlet port 83) are disposed, and a plurality of guide section 81c to 81f and 82c to 82f.

The outlet ports 83 and 84 protrude from the port sections 81a, 81b, 82a, and 82b toward the gasket 60. The port sections 81a, 81b, 82a, and 82b include inner surfaces from which the outlet ports 83 and 84 protrude respectively. The outlet ports 83 and 84 protrude from the inner surfaces of the port section 81a, 81b, 82a, and 82b toward the gasket 60. The inner surfaces of the port sections 81a, 81b, 82a, and 82b, that is, inner surfaces of upper port sections 81a and 82a and inner surfaces of lower port sections 81b and 82b may be formed in parallel.

The port sections 81a, 81b, 82a, and 82b may include the upper port sections 81a and 82a and the lower port sections 81b and 82b. The guide sections 81c to 81f and 82c to 82f may include a lower guide section 81f, a bent section 81e, a middle guide section 81d, and an upper guide section 81c.

Hereinafter, the shape of the transport conduit 81 and 82 is described from an upper side to a lower side.

The transport conduit 81 and 82 (or exemplified as a transport conduit 81) includes: the upper port sections 81a and 82a (or exemplified as an upper port section 81a) where the upper outlet ports 83a and 84b (or exemplified as an upper outlet port 83a) are disposed; the upper guide sections 81c and 82c (or exemplified as an upper guide section 81c) disposed at a lower side of the upper port sections 81a and extending in an arc shape; middle guide sections 81d and 82d (or exemplified as a middle guide section 81d) disposed at a lower side of the upper guide sections 81c to be farther away from the outer circumferential surface 61 of the gasket 60 toward a lower side; lower port sections 81b and 82b (or exemplified as a lower port section 81b) disposed at a lower side the middle guide sections 81d; bent sections 81e and 82e (or exemplified as a bent section 81e) bent from the lower port section 81b to be more adjacent to the vertical line OV, passing through the center O of the gasket 60, toward a lower side; and lower guide sections 81f and 82f (or exemplified as a lower guide section 81f) extending from lower sides of the bent sections 81e in an arc shape.

Hereinafter, the shape of the transport conduit 81 and 82 will be described from a lower side to an upper side.

The transport conduit 81 and 82 includes the arc-shaped lower guide sections 81f and 82f. The inlet port 85 protrudes downward from the lower guide sections 81f and 82f, and the lower guide section 81f of the first guide part 81 and the lower guide section 82f of the second conduit part 82 are connected at a point where the inlet port 85 is disposed. The lower guide part 81f of the first conduit part 81 extends in an arc shape along an outer circumferential surface of the first area of the gasket body 61 and 62, and the lower guide section 82f of the second conduit part 82 extends in an arc shape along an outer circumferential surface of the second area of the gasket body 61 and 62. Water introduced through the inlet port 85 is branched to the left and right sides and then guided upward by the lower guide sections 81*f* and 82*f* of the first and second conduit parts 81 and 82.

The transport conduit 81 and 82 includes the bent sections 81*e* and 82*e* bent at the upper ends of the lower guide sections 81*f* and 82*f* in directions away from the gasket body 61 and 62. The upper ends of the lower guide sections 81*f* and 82*f*, and one ends of the bent sections 81*e* and 82*e* toward the lower guide sections 81*f* and 82*f* are in contact with the outer circumferential surface 61 of the gasket body, and the other ends of the lower guide sections 81*f* and 82*f* may be spaced apart from the outer circumferential surface 61 of the gasket body. Alternatively, a distance between each of the other ends of the lower guide sections 81*f* and 82*f* and the outer circumferential surface 61 of the gasket body may be greater than a distance between each of one ends of the bent sections 81*e* and 82*e* and the outer circumferential surface 61 of the gasket body.

The transport conduit 81 and 82 includes the lower port sections 81*b* and 82*b* spaced apart from the outer circumferential surface 61 of the gasket body. The above-described first and second portions refer to the lower port sections 81*b* and 82*b*. The lower port sections 81*b* and 82*b* extend upward from the bent sections 81*e* and 82*e* to be spaced apart from the outer circumferential surface 61 of the gasket body. The lower outlet ports 83*b* and 84*b* protrude from the lower port sections 81*b* and 82*b*. Accordingly, a space for coupling the lower outlet ports 83*b* and 84*b* and the lower port receiving pipes 63*b* and 64*b* is provided between the transport conduit 81 and 82 and the outer circumferential surface 61 of the gasket body.

At least a portion of the transport conduit 81 and 82 may include the upper port sections 81*a* and 82*a* spaced apart from the outer circumferential surface 61 of the gasket body. The upper ports 83*a* and 84*a* protrude from the upper port sections 81*a* and 82*a*.

As described above, the distance between each of the lower port receiving pipes 63*b* and 64*b* and the horizontal line OH passing through the center O of the gasket is smaller than the distance between each of the upper port receiving pipes 63*a* and 64*a* and the horizontal line OH passing through the center O of the gasket. Accordingly, the distance between each of the lower port receiving pipes 63*b* and 64*b* and the vertical line OV passing through the center O of the gasket body 61 and 62 is smaller than the distance between each of the upper port receiving pipes 63*a* and 64*a* and the vertical line OV. In response, the distance between each of the lower port sections 81*b* and 82*b* and the vertical line OV is greater than the distance between each of the upper port sections 81*a* and 82*a* and the vertical line OV.

The transport conduit 81 and 82 includes the middle guide sections 81*d* and 82*d* between the lower port sections 81*b* and 82*b* and the upper port sections 81*a* and 82*a*, and the upper guide sections 81*c* and 82*c*. The middle guide sections 81*d* and 82*d* extend upward from the lower port sections 81*b* and 82*b*. The middle guide sections 81*d* and 82*d* may extend from the lower port sections 81*b* and 82*b* to a height corresponding to the center O of the gasket body 61 and 62 and may extend in parallel with the vertical line OV passing through the center O of the gasket body 61 and 62.

The upper guide sections 81*c* and 82*c* may extend in an arc shape from the upper ends of the middle guide sections 81*d* and 82*d*. The upper guide sections 81*c* and 82*c* may extend in an arc shape from the upper ends of the middle guide sections 81*d* and 82*d* along the outer circumferential surface 61 of the gasket body.

The upper port sections 81*a* and 82*a* may be bent from the upper ends of the upper guide sections 81*c* and 82*c* in a direction away from the gasket body 61 and 62. Thus, even though the lower ends of the upper port sections are brought into contact with the outer circumferential surface 61 of the gasket body, at least a portion of the upper port sections 81*a* and 82*a* may be spaced apart from the outer circumferential surface 61 of the gasket body.

The upper port section 81*a* and 82*a* may form the left and right upper ends of the transport conduit. An upper port section 81*a* of the first conduit part and an upper port section 82*a* of the second conduit part may be separated from each other.

Hereinafter, the shape of the transport conduit 81 will be described in a counter-clockwise direction from the left upper end.

The transport conduit 81 may include the upper port section 81*a* in which the upper outlet port 83*a* to be inserted into the upper port receiving pipe 63*a* or 64*a* (or exemplified as an upper port receiving pipe 63*a*) is disposed. The upper port section 81*a* may form the upper end of the transport conduit 81.

The upper port section 81*a* may have an inner surface vertical to a direction in which the upper outlet port 83*a* protrudes. Accordingly, as shown in FIG. 10, if the upper outlet port 83*a* protrudes vertically, the upper port section 81*a* may have an inner surface that is parallel to the vertical line OV passing through the center O of the gasket 60. The upper port section 81*a* may have an outer surface that is inclined in a direction farther away from the inner surface toward a rear surface.

The transport conduit 81 may have the arc-shaped upper guide section 81*c* at a lower side of the upper port section 81*a*. The upper guide section 81*c* may be formed in an arc shape having a central angle smaller than 90°. The upper guide section 81*c* may extend in an arc shape from the lower side of the upper port section 81*a* to a height corresponding to the center O of the gasket 60. Accordingly, the bottom of the upper guide section 81*c* may have a tangent line parallel to the vertical line OV.

A central angle of the upper guide section 81*c* may be within a range between 20° and 50°. Since the upper port section 81*a* is disposed at an upper side of the upper guide section 81*c* and the outlet port 83*a* protrudes from the upper port section 81*a* to supply water to the upper nozzle 66*a*, a position at which the upper nozzle 66*a* is disposed on the inner circumferential surface 62 of the gasket 60 may be a corresponding position.

The transport conduit 81 may have the middle guide section 81*d* extending downward from the upper guide section 81*c*. The middle guide section 81*d* may extend downward from the lower side of the upper guide section 81*c*. The middle guide section 81*d* may be spaced apart from the outer circumferential surface 61 of the gasket 60.

The middle guide section 81*d* and the bent section 81*e* are portions that make the lower port section 81*b* to be spaced apart from the outer circumferential surface 61 of the gasket 60.

The middle guide section 81*d* may have a curvature radius greater than a curvature radius of the upper guide section 81*c* or may extend from the upper guide section 81*c* in a direction parallel to the vertical line OV. The middle guide section 81*d* may extend in a direction parallel to an inner surface of the lower port section 81*e*. The middle guide section 81*d* may be further away from the outer circumferential surface 61 of the gasket 60 toward a lower side.

The middle guide section 81*d* may connect the upper guide section 81*c* and the lower port section 81*b*.

The transport conduit 81 may have the lower port section 81*b* at a lower side of the lower guide section 81*d*. The lower port section 81*b* may extend from the bottom of the lower guide section 81*d* in a direction identical to that of the middle guide direction 81*d*.

The upper guide section 81*c* and the middle guide section 81*d* may be provided between the upper port section 81*a* and the lower port section 81*b*.

Meanwhile, the transport conduit 81 may be at a fixed position as the outlet port 83 is coupled to the gasket 60 or as the outlet port 83 is inserted into the gasket 60. However, since the gasket 60 is configured to seal between the tub 30 and the casing 10 and connect the tub 30 and the casing 10, a thickness may not be sufficient to insert the outlet port 83 so as to fix the transport conduit 81. Therefore, the gasket 60 include the port receiving pipes 63 and 64 (or exemplified as a port receiving pipe 63) protruding from the outer circumferential surface 61, and the outlet port 83 is inserted into the port receiving pipe 63, and accordingly, the transport conduit 81 may be disposed without being separated from the outer circumferential surface 61 of the gasket 60.

A space for the port receiving pipe 63 is needed between the inner surface of the transport conduit 81 and the outer circumferential surface 61 of the gasket 60. The upper port section 81*a* has an inner surface that is further spaced apart from the outer circumferential surface 61 of the gasket 60 in a direction upward from the upper guide section 81*c*, and the lower port section 81*b* is provided between the middle guide section 81*d* and the bent section 81*e*, and accordingly, a space where the lower outlet port 83*b* or 84*b* (or exemplified as a lower outlet port 83*b*) and the lower port receiving pipe 63*b* or 64*b* (or exemplified as a lower port receiving pipe 63*b*) is provided between the lower port section 81*b* and the outer circumferential surface 61 of the gasket.

The lower port section 81*b* may have an inner surface that is vertical to a direction in which the lower outlet port 83*b* protrudes. The lower port section 81*b* may have an outer surface that is parallel to the inner surface.

The transport conduit 81 may have the bent section 81*e* disposed at the lower side of the lower port section 81*b* and bent in a direction to be more adjacent to the vertical line OV, passing through the center O of the gasket 60, toward a lower side. The bent section 81*e* may extend between the lower port section 81*b* and the lower guide section 81*f*.

The transport conduit 81 of the washing machine according to the first embodiment of the present invention may have the arc-shaped lower guide sections 81*f* and 82*f* under the bent sections 81*e* and 82*e*. The lower guide sections 81*f* and 82*f* forms the bottom of the transport conduit 81 and 82.

The lower guide sections 81*f* and 82*f* may extend in an arc shape from the bent section 81*e* located on the left side of the transport conduit 81 and 82, pass through the vertical line OV passing through the center O of the gasket 60, and then extend in an arch shape to the bent section 82*e* located on the right side of the transport conduit 81 and 82. The lower guide section 81*f* of the first conduit part 81 and the lower guide section 82*f* of the second conduit part 82 may meet each other at the bottom of the transport conduit 81 and 82, that is, at a point where the inlet port 85 is formed, to thereby form the lower guide sections 81*f* and 82*f*. Accordingly, the first conduit part 81 and the second conduit part 82 may be connected to each other to thereby form a single transport conduit 81 and 82.

The lower guide sections 81*f* and 82*f* may be formed in an arc shape having a central angle smaller than 180° and may be bilaterally symmetrical about the vertical line OV passing through the center O of the gasket 60. The central angle of the lower guide sections 81*f* and 82*f* may be equal to or greater than 120° and smaller than 180°.

As described above, the transport conduit 81 and 82 may be bilaterally symmetrical. In the counter-clockwise direction, the right conduit part 82 of the transport conduit 81 and 82 may include: the bent section 82*e* disposed at an upper side of the lower guide section 82*f* and bent in a direction to be further spaced apart from the vertical line OV, passing through the center O of the gasket 60, toward an upper side; the lower port section 82*b* disposed at an upper side of the bent section 82*e*; the middle guide section 82*d* disposed at an upper side of the lower port section 82*b*; the upper guide section 82*c* disposed at an upper side the middle guide section 82*d* and formed in an arc shape; and the upper port section 82*a* disposed at an upper side of the upper guide section 82*c*.

Meanwhile, the upper and lower port sections 81*a*, 81*b*, 82*a*, and 82*b* may be spaced apart from the outer circumferential surface 61 of the gasket 60, and at least a portion of the upper guide section 81*b* and 82*b* and the lower guide section 81*f* and 82*f* may be brought into contact with the outer circumferential surface of the gasket.

In addition, the upper and lower guide sections 81*b*, 82*b*, 81*f*, and 82*f* may be spaced apart from the outer circumferential surface of the gasket in directions outward of the gasket. In this case, a distance between each of the upper and lower port sections 81*a*, 81*b*, 82*a*, and 82*b* and the circumferential surface 61 of the gasket 60 may be greater than a distance between each of the upper and lower guide sections 81*b*, 82*b*, 81*f*, and 82*f* and the circumferential surface 61 of the gasket 60.

Due to this configuration, it is possible to avoid interference with any other structure (e.g., the balancer 90) disposed between the distribution pipe 80 and the front surface 31 of the tub 30 and to provide a space for coupling the outlet ports 83 and 84 and the port receiving pipes 63 and 64.

As described above, the transport conduit 81 and 82 may include the first conduit part 81 disposed in the left side, and the second conduit part 82 disposed in the right side. The upper port section 81*a*, the upper guide section 81*c*, the middle guide section 81*d*, the lower port section 81*b*, the bent section 81*e*, and the lower guide section 81*f* included in the first conduit part 81 may be respectively referred to as a first upper port section 81*a*, a first upper guide section 81*c*, a first middle guide section 81*d*, a first lower port section 81*b*, a first bent section 81*e*, and a first lower guide section 81*f*. In addition, the upper port section 82*a*, the upper guide section 82*c*, the middle guide section 82*d*, the lower port section 82*b*, the bent section 82*e*, and the lower guide section 82*f* included in the second conduit part 82 may be respectively referred to as a second upper port section 82*a*, a second upper guide section 82*c*, a second middle guide section 82*d*, a second lower port section 82*b*, a second bent section 82*e*, and a second guide section 82*f*.

In order to describe the shape of the transport conduit 81 from a different perspective, a virtual circle VO having the same center of the gasket 60 may be defined.

The upper port section 81*a* may be spaced apart from the virtual circle VO, and may become adjacent to the virtual circle VO toward a lower side.

The upper guide section 81*c* may be in contact with the virtual circle VO. The upper guide section 81*c* may extend from the bottom of the upper port section 81*a* to a height corresponding to the center of the virtual circle VO.

The middle guide section 81*d* may be spaced apart from the virtual circle VO. The middle guide section 81*d* may be a curved line having a curvature radius greater than that of the upper guide section 81*c* or may be formed in parallel with a tangent line of the bottom of the upper guide section 81*c*.

The lower port section 81*b* and the bent section 81*e* may be spaced apart from the virtual circle VO.

The lower guide section 81*f* and 82*f* may be brought into contact with the virtual circle VO. The left side 81*f* and the right side 82*f* of the lower guide section 81*f* and 82*f* may be connected to each other at the lowest point of the virtual circle VO.

The outlet ports 83 and 84 may protrude from the port sections 81*a*, 81*b*, 82*a*, and 82*b* of the transport conduit toward the center O of the gasket 60 and be inserted into the port receiving pipes 63 and 64. The outlet ports 83 and 84 may guide circulating water, flowing along the transport conduit 81 and 82, to the nozzles 66 and 67 to spray the circulating water into the drum 40.

A diameter of each of the outlet ports 83 and 84 may be a bit greater than an inner diameter of each of the port receiving pipes 63 and 64 (a diameter of a hole communicating with the nozzles 66 and 67), so that the outlet ports 83 and 84 can be press-fitted into the port receiving pipes 63 and 64. When the circulating water flows from the outlet ports 83 and 84 toward the nozzles 66 and 67, a reaction force in a direction opposite to the gasket 60 may be applied to the port sections 81*a*, 81*b*, 82*a*, and 82*b*. In order to prevent the distribution pipe 80 from being separated from the gasket 60 by the reaction force, the port receiving pipes 63 and 64 may be formed to protrude outward from the outer circumferential surface 61 of the gasket 60, the diameter of each of the outlet ports 83 and 84 may be a bit greater than the inner diameter of each of the port receiving pipes 63 and 64, and a protrusion is formed on the outer circumference of each of the outlet ports 83 and 84 to increase friction force.

The outlet ports 83 and 84 includes a first outlet port 83 protruding from the first port section 81*a* or 81*b* in a direction toward the vertical line OV passing through the center O of the gasket 60, and a second outlet port 84 protruding from the second port section 82*a* or 82*b* in a direction toward the vertical line OV passing through the center O of the gasket 60. The first outlet port 83 is inserted into the first port receiving pipe 63 to guide circulating water to the first nozzle 66, and the second outlet port 84 is inserted into the second port receiving pipe 64 to guide circulating water to the second nozzle 67.

The first outlet port 83 may include a first lower outlet port 83*b* inserted into the first lower port receiving pipe 63*b*, and a first upper outlet port 83*a* inserted into the first upper port receiving pipe 63*a*. The first upper outlet port 83*a* and the first lower outlet port 83*b* may respectively protrude from the first upper port section 81*a* and the first lower port section 81*b* to be respectively inserted into the first upper port receiving pipe 63*a* and the first lower port receiving pipe 63*b*, thereby guiding circulating water to the first upper nozzle 66*a* and the first lower nozzle 66*b*.

The second outlet port 84 may include a second lower outlet port 84*b* to be inserted into the second lower port receiving pipe 64*b*, and a second upper outlet port 84*a* to be inserted into the second upper port receiving pipe 64*a*. The second upper outlet port 84*a* and the second lower outlet port 84*b* may respectively protrude from the second upper port section 82*a* and the second lower port section 82*b* to be respectively inserted into the second upper port receiving pipe 64*a* and the second lower port receiving pipe 64*b*, thereby guiding circulating water to the second upper nozzle 67*a* and the second lower nozzle 67*b*.

Meanwhile, referring to FIGS. 3 and 5, one end of the circulation pipe 86 is connected to the inlet port 85 protruding from the bottom of the distribution pipe 80, and the other end of the circulation pipe 86 may be connected to the circulation port 78 of the pump 70. In the case where the circulation port 78 of the pump 70 is formed at a position facing the inlet port along a straight line, the circulation pipe 86 may have a straight pipe shape. However, in other cases, the circulation pipe 86 may be formed as a hose made from a flexible substance or may be formed by bending.

The circulation pipe 86 may be formed of a substance that is flexible but able to maintain a shape thereof. In the embodiment of the present invention, the circulation pipe 86*b* may be formed of ethylene propylene diene monomer rubber (EPDM). The circulation pipe 86 may include a bellows structure.

Referring to FIGS. 3 and 4, the washing machine according to an embodiment of the present invention includes the balancer 90 disposed at the front surface 31 of the tub 30. The balancer 90 may be fastened to the front surface 31 of the tub 30. The balancer 90 is used to reduce vibration of the tub 30, and the balancer 90 is a weight body having a predetermined weight. The balancer 90 may include one or more balancers 90 disposed along a circumference of the front surface 31 of the tub 30.

A balancer 90 of a washing machine according to the first embodiment of the present invention may include a first balancer 91 and a second balancer 92 respectively disposed to the left and right sides of the front surface 31 of the tub 30. The first balancer 91 may be disposed to the left side of the gasket 60, and the second balancer 92 may be disposed to the right side of the gasket 60.

The first balancer 91 and the second balancer 92 may be spaced apart from each other both at an upper side and at a lower side. The first and second balancers 91 and 91 may be in a bilaterally symmetrical shape about the vertical line OV passing through the center O of the gasket 60, and may be disposed at positions bilaterally symmetrical about the vertical line.

Figure 11:
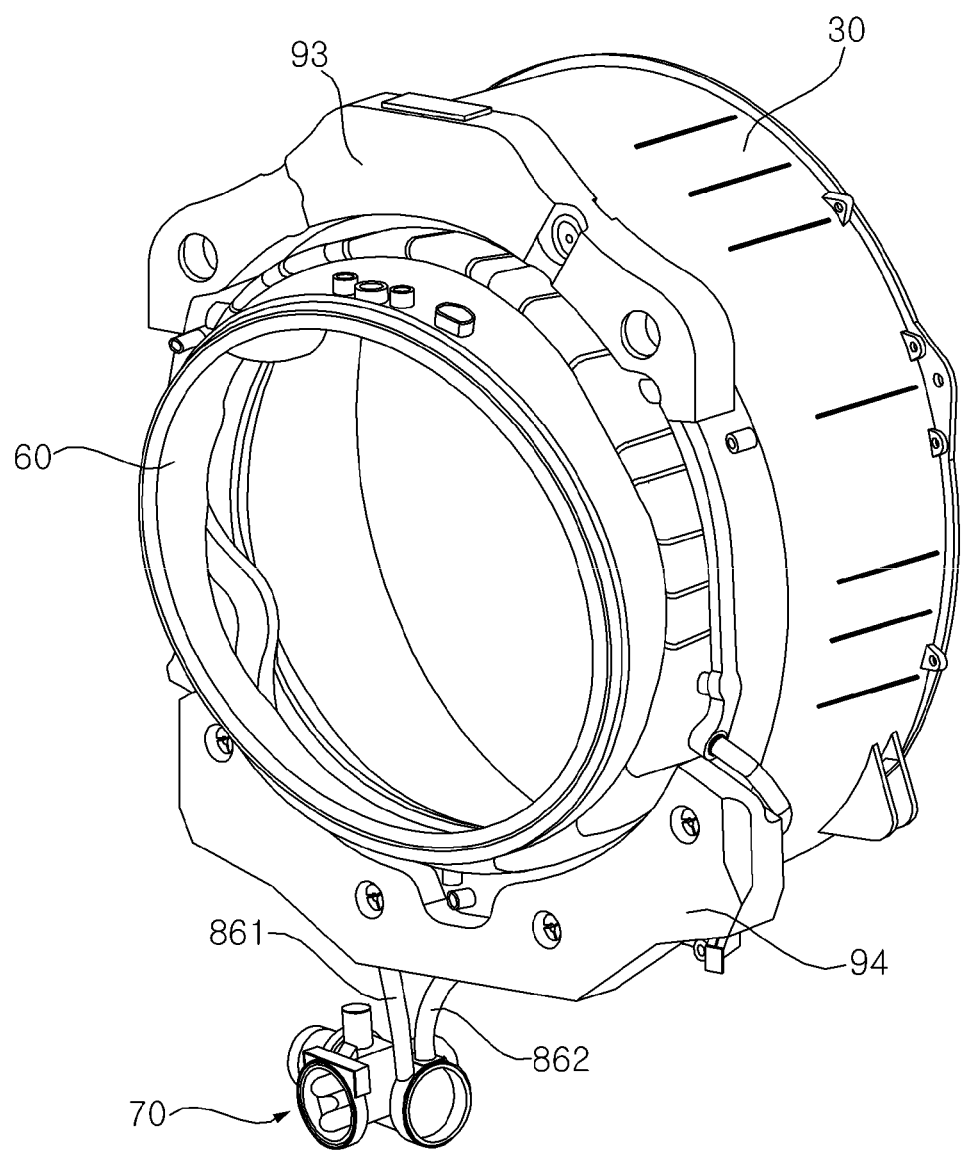
FIG. 11 illustrates a portion of a washing machine according to a second embodiment of the present invention.
Figure 13:
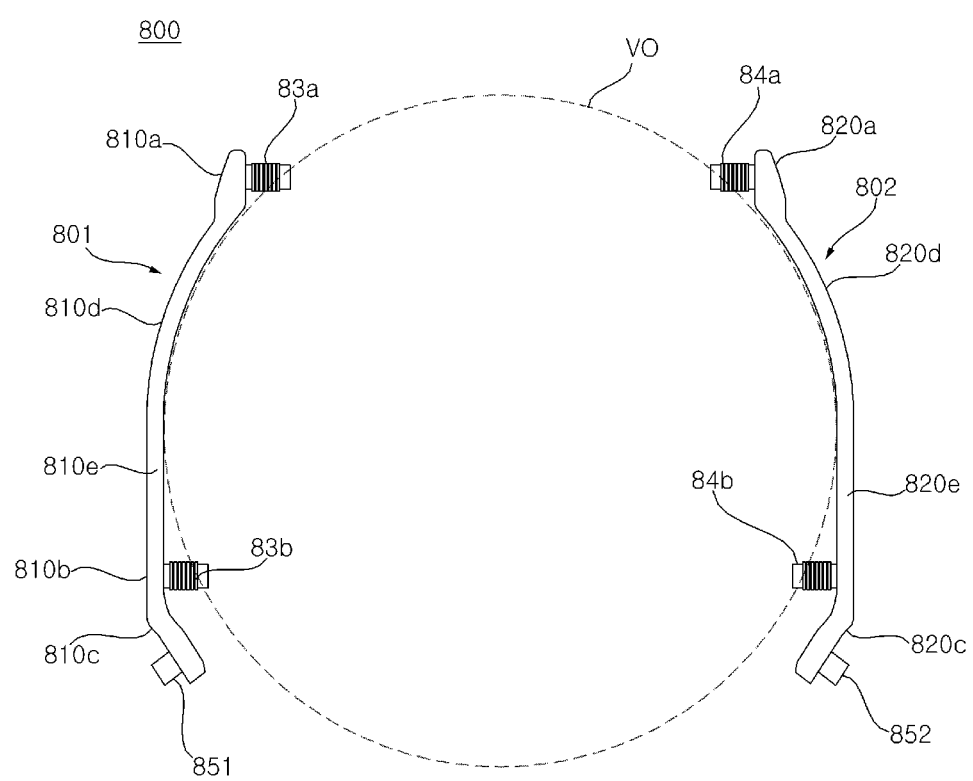
FIG. 13 is a front view of the distribution pipe shown in FIG. 11.

Referring to FIGS. 11 to 13, a washing machine according to a second embodiment of the present invention may include a gasket 60 for connecting a casing 10 and a tub 30, nozzles 66 and 67 for spraying water into the drum 40, a pump 70 for pumping water discharged from the tub 30, and a distribution pipe 800 for guiding the water pumped by the pump 70 to the nozzles 66 and 67. In addition, the washing machine may include a balancer 90 disposed at a front surface 31 of the tub 30, and a circulation pipe 860 for guiding the water pumped by the pump 70 to the distribution pipe 800.

The washing machine according to the second embodiment of the present invention is different from the washing machine according to the first embodiment of the present invention in terms of structure regarding the balancer 90, the distribution pipe 800, and the circulation pipe 860.

The balancer 90 of the washing machine according to the second embodiment of the second embodiment is disposed at the front surface 31 of the tub 30, and includes an upper balancer 83 and a lower balancer 84, which are separated vertically. The upper balancer 93 is disposed at an upper side the gasket 60, and the lower balancer 94 is disposed at a lower side the gasket 60. The upper balancer 93 and the lower balancer 94 are disposed to be vertically spaced apart from each other.

The distribution pipe 800 of the washing machine according to the second embodiment of the second embodiment may include a first distribution pipe 801 and a second distribution pipe 802, which are disposed on the left and right sides of the gasket 60. The first distribution pipe 801 may supply water pumped by the pump 70 to a first nozzle 66, and the second distribution pipe 802 may supply water pumped by the pump 70 to a second nozzle 67.

The first distribution pipe 801 and the second distribution pipe 802 may be formed and disposed in a bilaterally symmetrical shape about a vertical line OV passing through the center O of the gasket 60. Alternatively, the first distribution pipe 801 and the second distribution pipe 802 may have the same shape and be disposed to be bilaterally symmetrical about the vertical line OV passing through the center O of the gasket 60.

The first and second distribution pipes 801 and 802 respectively include first and second transport conduits 810 and 820 for guiding water pumped by the pump 70, and first and second outlet ports 830 and 840 protruding from the first and second transport conduits 810 and 820 toward the gasket 60 and coupled to port receiving pipes 63 and 64. In addition, the first and second distribution pipes 801 and 802 may respectively include first and second inlet ports 851 and 852 through which water discharged from the pump is introduced. The first and second transport conduits 810 and 820 may guide water introduced through the first and second inlet ports 851 and 852 to the port receiving pipes 63 and 64.

The transport conduits 810 and 820 included in the distribution pipe 800 are disposed on an outer circumferential surface 61 of the gasket body. Each of the first and second transport conduits 810 and 820 includes an inner surface opposing the outer circumferential surface 61 of the gasket body, and an outer surface opposite to the inner surface.

The distribution pipe 800 may be coupled to the gasket 60 as the outlet ports 83 and 84 are inserted into the port receiving pipes 63 and 64. The first distribution pipe 801 may be coupled to the gasket 60 as the first outlet port 830 is inserted into the first port receiving pipe 63. The second distribution pipe 802 may be coupled to the gasket 60 as the second outlet port 840 is inserted into the second port receiving pipe 64.

The first and second outlet ports 83 and 84 may respectively protrude from the inner surfaces of the first and second transport conduits 810 and 820, and the first and second inlet ports 851 and 852 may respectively protrude from the outer surfaces of the first and second transport conduits 810 and 820.

The first and second transport conduits 810 and 820 may include portions 810b and 820b spaced apart from the outer circumferential surface 61 of the gasket body, and the lower outlet ports 83b and 84b may be disposed at the spaced portions. The spaced portion of the first transport conduit 810 may be referred to as a first portion 81b, and the spaced portion of the second transport conduit 820 may be referred to as a second portion 82b. The first lower outlet port 82b protrudes from the first portion 81b, and the second lower outlet port 83b protrudes from the second portion 82b. Since the first and second transport conduits 810 and 820 are formed and disposed symmetrically, as described above, the first transport conduit 810 will be hereinafter described, and a description of the second transport conduit 820 is omitted.

The transport conduit 810 may be divided into port sections 810a and 810b where the outlet port 830 is disposed, an introduction section 810c where the inlet port 851 is disposed, and guide ports 810d and 810e. The port sections 810a and 810b may include an upper port section 810a and a lower port section 810b. The guide sections 810d and 810e may include a middle guide section 810e and an upper guide section 810d.

The transport conduit 810 includes: the upper port section 810a where the upper outlet port 830 is disposed; the upper guide section 810d disposed at a lower side of the port section 810a and extending in an arc shape; the middle guide section 810e disposed under the upper guide section 810d to be further spaced apart from the outer circumferential surface 61 of the gasket 60 toward a lower side; the lower port section 810b disposed at a lower side of the middle guide section 810e; and the introduction section 810c in which the inlet port 851 is disposed, and which is disposed at the lower side the lower port section 810b and bent to be more adjacent to the vertical line OV, passing through the center O of the gasket 60, to a lower side.

The upper port section 810a, the upper guide section 810d, the middle guide section 810e, and the lower port section 810b included in the transport conduit 810 according to the second embodiment of the present invention are respectively identical to the upper port section 81a, the upper guide section 81c, the middle guide section 81d, and the lower port section 81b included in the transport conduit 81 according to the first embodiment of the present invention, and thus a detailed description thereof is herein omitted.

The transport conduit 810 may include the introduction section 810c disposed at the lower side of the lower port section 810b and bent in a direction to be more adjacent to the vertical line OV, passing through the center O of the gasket 60, toward a lower side. The inlet port 851 may be disposed in the introduction section 810c.

The introduction section 810c may be inclined in a direction to be further spaced apart from the vertical line OV, passing through the center O of the gasket 60, toward an upper side. At least an upper end of the introduction section 810c may be spaced apart from the outer circumferential surface 61 of the gasket body.

The lower port section 810b may extend upward from the upper end of the introduction section 810c. The lower port section 810b may be spaced apart from the outer circumferential surface 61 of the gasket body.

The inlet port 851 may protrude outward from the introduction section 810c, particularly an outer space of the introduction section 810c, in the outer surface of the transport conduit 810. The inlet pot 851 may protrude in a direction vertical to the outer surface of the introduction section 810c.

In order to describe the shape of the transport conduit 810 from a different perspective, a virtual surface VO having the same center O of the gasket 60 may be defined.

The upper port section 810a may be spaced apart from the virtual circle VO and may become adjacent to the virtual circle VO toward a lower side.

The upper guide section 810d may be brought into contact with the virtual circle VO. The upper guide section 810d may extend from the bottom of the upper port section 810a to a height corresponding to the center of the virtual circle VO.

The middle guide section 810e may be spaced apart from the virtual circle VO. The middle guide section 810e may be a curved line having a curvature radius greater than that of the upper guide section 810d or may be formed in parallel with a tangent line of the bottom of the upper guide section 810d.

The lower port section 810b and the introduction section 810c may be spaced apart from the virtual circle VO.

The outlet port 830 of the washing machine according to the second embodiment of the present invention, and a coupling relationship between the outlet port 830 and the gasket 60 are identical as described in the first embodiment of the present invention, and thus, a detailed description thereof is herein omitted.

The circulation pipe 860 of the washing machine according to the second embodiment of the present invention may include a first circulation pipe 861 for guiding water pumped by the pump to the first distribution pipe 801, and a second circulation pipe 862 for guiding water pumped by the pump to the second distribution pipe 802.

The first circulation pipe 861 and the second circulation pipe 862 may be a hose formed of a flexible substance and connecting the pump 70 and the distribution pipe 800, unlike the circulation pipe 86 according to the first embodiment.

The pump 70 may include two circulation ports, unlike the first embodiment, and the two circulation ports may be respectively coupled to the first and second circulation pipes 861 and 862.

Although some embodiments have been described above, it should be understood that the present invention is not limited to these embodiments, and that various modifications, changes, alterations and variations can be made by those skilled in the art without departing from the spirit and scope of the invention. Therefore, it should be understood that the above embodiments are provided for illustration only and are not to be construed in any way as limiting the present invention.

What is claimed is:

1. A washing machine comprising:
    a casing having a laundry entry hole defined at a front surface of the casing;
    a tub disposed in the casing, the tub having an opening defined at a front surface of the tub;
    a drum rotatably disposed in the tub;
    a gasket comprising a gasket body that has a cylindrical shape and defines a passage connecting the laundry entry hole and the opening of the tub;
    a first nozzle and a second nozzle that are configured to spray water into the drum;
    a pump configured to pump water discharged from the tub; and
    a distribution pipe configured to guide water pumped by the pump to the first nozzle and the second nozzle,
    wherein the distribution pipe comprises:
        an inlet port configured to receive water pumped by the pump,
        a first outlet port coupled to the gasket and configured to guide water pumped by the pump to the first nozzle,
        a second outlet port coupled to the gasket and configured to guide water pumped by the pump to the second nozzle, and
        a transport conduit that extends along an outer circumferential surface of the gasket body, wherein the inlet port, the first outlet port, and the second outlet port are sequentially disposed on the transport conduit, and
    wherein the transport conduit comprises:
        a first guide section extending from the inlet port,
        a first port section from which the first outlet port protrudes, and
        a bent section that connects the first guide section and the first port section, the bent section being bent from the first port section in a direction toward a vertical line passing through a center of the gasket body.

2. The washing machine of claim 1, wherein the first guide section extends in an arc shape along the outer circumferential surface of the gasket body.

3. The washing machine of claim 2, further comprising a circulation pipe connecting the pump and the inlet port of the distribution pipe.

4. The washing machine of claim 2, wherein the first port section extends straight.

5. The washing machine of claim 1, wherein the first outlet port is adjacent to a bent point of the transport conduit between the first port section and the bent section.

6. The washing machine of claim 1, wherein the first nozzle and the second nozzle are disposed at an inner circumferential surface of the gasket body.

7. The washing machine of claim 6, wherein the gasket further comprises a first port receiving pipe protruding from the outer circumferential surface of the gasket body and communicating with the first nozzle,
    wherein the first outlet port is inserted into the first port receiving pipe.

8. The washing machine of claim 7, wherein the gasket further comprises a second port receiving pipe protruding from the outer circumferential surface of the gasket body and communicating with the second nozzle,
    wherein the second outlet port is inserted into the second port receiving pipe.

9. The washing machine of claim 7, wherein the bent section is bent from the first guide section in a direction away from the gasket body,
    wherein a distance between the first port section and the outer circumferential surface of the gasket body is greater than a distance between the first guide section and the outer circumferential surface of the gasket body.

10. The washing machine of claim 1, wherein the transport conduit further comprises:
    a second port section from which the second outlet port protrudes; and
    a second guide section connecting the first port section and the second port section.

11. The washing machine of claim 10, wherein the second port section is bent from the second guide section in a direction away from the gasket body, and
    wherein a distance between the second port section and the outer circumferential surface of the gasket body is greater than a distance between the second guide section and the outer circumferential surface of the gasket body.

12. The washing machine of claim 10, wherein, when the gasket body is divided into a first part and a second part in a widthwise direction of the casing, the transport conduit extends along an outer circumferential surface of the first part of the gasket body, and
    wherein the second guide section comprises:
    a middle guide section extending upward from the first port section; and
    an upper guide section extending in an arc shape from the middle guide section along the outer circumferential surface of the first part of the gasket body.

13. The washing machine of claim 12, wherein the middle guide section is positioned below a horizontal line passing through a center of the gasket body, Wherein the upper guide section is positioned above the horizontal line passing through the center of the gasket body.

14. The washing machine of claim 13, wherein the middle guide section extends straight in a vertical direction.

15. The washing machine of claim 8, wherein the transport conduit further comprises a second port section from which the second outlet port protrudes, wherein, when the gasket body is divided into a first part and a second part in a widthwise direction of the casing, the transport conduit extends along an outer circumferential surface of the first part of the gasket body, wherein the first port receiving pipe is disposed below a horizontal line passing through the center of the gasket body and the second port receiving pipe is disposed above the horizontal line passing through the center of the gasket body, and wherein a distance between the first port receiving pipe and the horizontal line is smaller than a distance between the second port receiving pipe and the horizontal line.

16. The washing machine of claim 15, wherein a distance between the first port section and the vertical line passing through the center of the gasket body is greater than a distance between the second port section and the vertical line passing through the center of the gasket body.

17. The washing machine of claim 7, wherein the transport conduit has an inner surface facing the outer circumferential surface of the gasket body, and wherein the first outlet port and the second outlet port protrude from the inner surface of the transport conduit.

18. The washing machine of claim 1, further comprising a third nozzle and a fourth nozzle that are configured to spray water into the drum, wherein the distribution pipe further comprises:

a third outlet port coupled to the gasket and guiding water pumped by the pump to the third nozzle; and a fourth outlet port coupled to the gasket and guiding water pumped by the pump to the fourth nozzle, and wherein, when the gasket body is divided into a first part and a second part in a widthwise direction of the casing, the first outlet port and the second outlet port are coupled to the first part of the gasket body, and the third outlet port and the fourth outlet port are coupled to the second part of the gasket body.

19. The washing machine of claim 18, wherein the transport conduit is symmetrical about the vertical line passing through the center of the gasket body, wherein the first outlet port is disposed symmetrically to the third outlet port about the vertical line passing through the center of the gasket body, and wherein the second outlet port is disposed symmetrically to the fourth outlet port about the vertical line passing through the center of the gasket body.

20. The washing machine of claim 18, wherein the transport conduit comprises:

a first conduit part extending along an outer circumferential surface of the first part of the gasket body and upwardly guiding water introduced from the inlet port; and a second conduit part extending along an outer circumferential surface of the second part of the gasket body and upwardly guiding water introduced from the inlet port, wherein a first end of the first conduit part and a first end of the second conduit part are connected to a point of the transport conduit at which the inlet port is disposed, and wherein a second end of the first conduit part and a second end of the second conduit part are separated from each other.

* * * * *